(12) United States Patent
Hansen

(10) Patent No.: US 7,509,366 B2
(45) Date of Patent: Mar. 24, 2009

(54) MULTIPLIER ARRAY PROCESSING SYSTEM WITH ENHANCED UTILIZATION AT LOWER PRECISION

(75) Inventor: Craig C. Hansen, Los Altos, CA (US)

(73) Assignee: Microunity Systems Engineering, Inc., Sunnyvale, CA (US)

( * ) Notice: Subject to any disclaimer, the term of this patent is extended or adjusted under 35 U.S.C. 154(b) by 1096 days.

(21) Appl. No.: 10/418,113

(22) Filed: Apr. 18, 2003

(65) Prior Publication Data

US 2004/0015533 A1    Jan. 22, 2004

Related U.S. Application Data

(63) Continuation of application No. 09/377,182, filed on Aug. 19, 1999, now Pat. No. 6,584,482, which is a continuation of application No. 08/857,596, filed on May 16, 1997, now Pat. No. 5,953,241, and a continuation-in-part of application No. 08/516,036, filed on Aug. 16, 1995, now Pat. No. 5,742,840.

(60) Provisional application No. 60/021,132, filed on May 17, 1996.

(51) Int. Cl.
*G06F 7/50* (2006.01)
*G06F 7/52* (2006.01)

(52) U.S. Cl. ................................................. 708/501

(58) Field of Classification Search ................ 708/620, 708/420, 501, 523, 603; 712/221
See application file for complete search history.

(56) References Cited

U.S. PATENT DOCUMENTS

| | | | |
|---|---|---|---|
| 4,025,772 A | 5/1977 | Constant | 235/156 |
| 4,489,393 A | 12/1984 | Kawahara et al. | 364/728 |
| 4,658,349 A | 4/1987 | Tabata et al. | |
| 4,701,875 A | 10/1987 | Konishi et al. | 364/728 |
| 4,727,505 A | 2/1988 | Konishi et al. | 364/728 |
| 4,785,393 A | 11/1988 | Chu et al. | |
| 4,814,976 A | 3/1989 | Hansen et al. | |
| 4,852,098 A | 7/1989 | Brechard et al. | |
| 4,875,161 A | 10/1989 | Lahti | |
| 4,876,660 A | 10/1989 | Owen et al. | 364/764 |
| 4,893,267 A | 1/1990 | Alsup et al. | 364/745 |

(Continued)

FOREIGN PATENT DOCUMENTS

CA    1 323 451    10/1993

(Continued)

OTHER PUBLICATIONS

Parallel Computers for Graphics Applications, Adam Levinthal, Pat Hanrahan, Mike Paquette, Jim Lawson, Pixar San Rafael, California, 1987.

(Continued)

*Primary Examiner*—David H Malzahn
(74) *Attorney, Agent, or Firm*—McDermott Will & Emery LLP

(57) ABSTRACT

A multiplier array processing system which improves the utilization of the multiplier and adder array for lower-precision arithmetic is described. New instructions are defined which provide for the deployment of additional multiply and add operations as a result of a single instruction, and for the deployment of greater multiply and add operands as the symbol size is decreased.

19 Claims, 13 Drawing Sheets

U.S. PATENT DOCUMENTS

| | | |
|---|---|---|
| 4,949,294 A | 8/1990 | Wambergue |
| 4,953,073 A | 8/1990 | Moussouris et al. |
| 4,956,801 A | 9/1990 | Priem et al. ............... 364/748 |
| 4,959,779 A | 9/1990 | Weber et al. |
| 4,969,118 A | 11/1990 | Montoye et al. ............ 364/748 |
| 4,975,868 A | 12/1990 | Freerksen ................... 364/748 |
| 5,031,135 A | 7/1991 | Patel et al. |
| 5,032,865 A | 7/1991 | Schlunt ................... 364/750.5 |
| 5,081,698 A | 1/1992 | Kohn |
| 5,113,506 A | 5/1992 | Moussouris et al. |
| 5,132,898 A | 7/1992 | Sakamura et al. |
| 5,155,816 A | 10/1992 | Kohn |
| 5,157,388 A | 10/1992 | Kohn ........................ 340/800 |
| 5,161,247 A | 11/1992 | Murakami et al. |
| 5,179,651 A | 1/1993 | Taaffe et al. |
| 5,201,056 A | 4/1993 | Daniel et al. ............... 395/800 |
| 5,208,914 A | 5/1993 | Wilson et al. |
| 5,231,646 A | 7/1993 | Health et al. |
| 5,233,690 A | 8/1993 | Shelock et al. |
| 5,241,636 A | 8/1993 | Kohn |
| 5,268,855 A | 12/1993 | Mason et al. ............... 364/748 |
| 5,268,995 A | 12/1993 | Diefendorff et al. ........ 395/122 |
| 5,280,598 A | 1/1994 | Osaki et al. |
| 5,325,495 A | 6/1994 | McLellan |
| 5,327,369 A | 7/1994 | Ashkenazi |
| 5,347,643 A | 9/1994 | Kondo et al. |
| 5,390,135 A | 2/1995 | Lee |
| 5,408,581 A | 4/1995 | Suzuki et al. .......... 364/724.16 |
| 5,410,682 A | 4/1995 | Sites et al. |
| 5,412,728 A | 5/1995 | Besnard et al. |
| 5,423,051 A | 6/1995 | Fuller et al. ................. 395/800 |
| 5,426,600 A | 6/1995 | Nakagawa et al. .......... 364/764 |
| 5,430,660 A | 7/1995 | Lueker et al. |
| 5,448,509 A | 9/1995 | Lee |
| 5,467,131 A | 11/1995 | Bhaskaran |
| 5,471,628 A | 11/1995 | Phillips et al. |
| 5,481,686 A | 1/1996 | Dockser |
| 5,487,024 A | 1/1996 | Girardeau, Jr. |
| 5,500,811 A | 3/1996 | Corry .................... 364/724.16 |
| 5,515,520 A | 5/1996 | Hatta et al. |
| 5,533,185 A | 7/1996 | Lentz et al. |
| 5,541,865 A | 7/1996 | Ashkenazi |
| 5,557,724 A | 9/1996 | Sampat et al. .............. 395/157 |
| 5,588,152 A | 12/1996 | Dapp et al. ................. 395/800 |
| 5,590,350 A | 12/1996 | Guttag |
| 5,590,365 A | 12/1996 | Ide et al. |
| 5,592,405 A | 1/1997 | Gove et al. .................. 364/749 |
| 5,600,814 A | 2/1997 | Gahan et al. |
| 5,636,351 A | 6/1997 | Lee |
| 5,640,543 A | 6/1997 | Farrell et al. ................ 395/502 |
| 5,642,306 A | 6/1997 | Mennemeier et al. ........ 364/757 |
| 5,666,298 A | 9/1997 | Peleg et al. ............. 364/715.08 |
| 5,669,010 A | 9/1997 | Duluk, Jr. .............. 395/800.22 |
| 5,673,407 A | 9/1997 | Poland et al. ................ 395/375 |
| 5,675,526 A | 10/1997 | Peleg et al. .................. 364/754 |
| 5,680,338 A | 10/1997 | Agarwal et al. ............. 364/736 |
| 5,721,892 A | 2/1998 | Peleg et al. .................. 395/562 |
| 5,734,874 A | 3/1998 | Van Hook et al. ........... 395/513 |
| 5,740,093 A | 4/1998 | Sharangpani |
| 5,742,840 A | 4/1998 | Hansen et al. |
| 5,757,432 A | 5/1998 | Dulong et al. ............... 348/384 |
| 5,758,176 A | 5/1998 | Agarwal et al. ............. 395/800 |
| 5,768,546 A | 6/1998 | Kwon |
| 5,778,412 A | 7/1998 | Gafken |
| 5,794,060 A | 8/1998 | Hansen et al. |
| 5,794,061 A | 8/1998 | Hansen et al. |
| 5,802,336 A | 9/1998 | Peleg et al. .................. 395/376 |
| 5,809,292 A | 9/1998 | Wilkinson et al. .......... 395/563 |
| 5,818,739 A | 10/1998 | Peleg et al. ............. 364/715.08 |
| 5,819,101 A | 10/1998 | Peleg et al. |
| 5,825,677 A | 10/1998 | Agarwal et al. ........ 364/736.03 |
| 5,828,869 A | 10/1998 | Johnson et al. |
| 5,835,782 A | 11/1998 | Lin et al. ................ 395/800.42 |
| 5,881,275 A | 3/1999 | Peleg et al. |
| 5,883,824 A | 3/1999 | Lee |
| 5,886,732 A | 3/1999 | Humpleman ................. 348/10 |
| 5,887,183 A | 3/1999 | Agarwal et al. |
| 5,898,849 A | 4/1999 | Tran |
| 5,922,066 A | 7/1999 | Cho et al. .................... 712/204 |
| 5,983,257 A | 11/1999 | Dulong et al. ............... 708/603 |
| 5,996,057 A | 11/1999 | Scales, III et al. |
| 6,016,538 A | 1/2000 | Guttag et al. ................. 712/32 |
| 6,041,404 A | 3/2000 | Roussel et al. |
| 6,052,769 A | 4/2000 | Huff et al. |
| 6,058,465 A | 5/2000 | Nguyen |
| 6,092,094 A | 7/2000 | Ireton ......................... 708/706 |
| 6,119,216 A | 9/2000 | Peleg et al. |
| 6,173,393 B1 | 1/2001 | Palanca et al. |
| 6,275,834 B1 | 8/2001 | Lin et al. |
| 6,295,599 B1 | 9/2001 | Hansen et al. |
| 6,401,194 B1 | 6/2002 | Nguyen et al. .............. 712/210 |
| 6,425,073 B2 | 7/2002 | Roussel et al. |
| 6,453,368 B2 | 9/2002 | Yamamoto |
| 6,516,406 B1 | 2/2003 | Peleg et al. |
| 6,539,467 B1 | 3/2003 | Anderson et al. |
| 6,567,908 B1 | 5/2003 | Furuhashi |
| 6,574,724 B1 | 6/2003 | Hoyle et al. |
| 6,584,482 B1 | 6/2003 | Hansen et al. |
| 6,631,389 B2 | 10/2003 | Lin et al. |
| 6,643,765 B1 | 11/2003 | Hansen et al. |
| 6,725,356 B2 | 4/2004 | Hansen et al. |
| 7,216,217 B2 | 5/2007 | Hansen et al. |

FOREIGN PATENT DOCUMENTS

| | | |
|---|---|---|
| EP | 0 468 820 A2 | 1/1992 |
| EP | 0 474 246 A2 | 3/1992 |
| EP | 0 654 733 A1 | 11/1993 |
| EP | 0 649 085 A1 | 4/1995 |
| EP | 0 651 321 A | 5/1995 |
| EP | 0 653 703 A1 | 5/1995 |
| EP | 0 654 733 A1 | 5/1995 |
| JP | S60-217435 | 10/1985 |
| JP | 3268024 | 11/1991 |
| JP | 6095843 | 4/1994 |
| WO | WO 93/01543 | 1/1993 |
| WO | WO 93/01565 | 1/1993 |
| WO | WO 93/11500 | 6/1993 |
| WO | WO 97/07450 | 2/1997 |

OTHER PUBLICATIONS

Organization of the Motorola 88110 Superscalar RISC Microprocessor, Keith Diefendorff and Michael Allen.

Microprocessor Report, vol. 7 No. 13, Oct. 4, 1993, IBM Regains Performance Lead with Power2, Six Way Superscalar CPU in MCM Achieves 126 SPECint92.

IBM Creates PowerPC Processors for AS/400, Two New CPU's Implement 64-Bit Power PC with Extensions by Linley Gwennap, Jul. 31, 1995.

The Visual Instruction Set (VIS) in UltraSPAR™, L. Kohn, G. Maturana, M. Tremblay, A. Prabhu, G. Zyner, May 3, 1995.

Osborne McGraw-Hill, i860™ Microprocessor Architecture, Neal Margulis, Foreword by Les Kohn.

A General-Purpose Array Processor for Seismic Processing, Nov.-Dec. 1984, vol. 1, No. 3) Revisiting past digital signal processor technology, Don Shaver- Jan.-Mar. 1998.

Accelerating Multimedia with Enhanced Microprocessors, Ruby B. Lee, 1995.

Ide, et al., "A 320-MFLOPS CMOS Floating-point Processing Unit for Superscalar Processors," p. 12-21, Mar. 28, 1993, IEEE J. of Solid-State Circuits.

K. Uchiyama et al., The Gmicro/5OO Superscalar Microprocessor with. Branch Buffers, IEEE Micro, Oct. 1993, p. 12-21.

Ruby B. Lee, Realtime MPEG Video Via Software Decompression on a PA-RISC Processor, IEEE (1995).

Karl M. Guttag et al. "The TMS34010: An Embedded Microprocessor", IEEE Jun. 1988, p. 186-190.

M. Awaga et al., "The μVP 64-bit Vector Coprocessor: A New Implementation of High-Performance Numerical Computation", IEEE Micro, vol. 13, No. 5, Oct. 1993, p. 24-36.

Tom Asprey et al., "Performance Features of the PA7100 Microprocessor", IEEE Micro (Jun. 1993), p. 22-35.

Gove, Robert J., "The MVP: A Highly-Integrated Video Compression Chip," IEEE Data Compression Conf., Mar. 1994, pp. 215-224.

Woobin Lee, et al., "Mediastation 5000: Integrating Video and Audio," IEEE Multimedia, 1994, pp. 50-61.

Karl, Guttag et. al "A Single-Chip Multiprocessor for Multimedia: The MVP," IEEE Computer Graphics & Applications, Nov. 1992, p. 53-64.

TMS32OC8O (MVP) Master Processor User's Guide, Texas Instruments, Mar. 1995, p. 1-33.

TMS320C80 (MVP) Parallel Processor User's Guide ["PP"]; Texas Instruments Mar. 1995, p. 1-80.

Shipnes, Julie, "Graphics Processing with the 88110 RISC Microprocessor," IEEE COMPCOM, (Spring,1992) pp. 169-174.

ILLIAC IV: Systems Characteristics and Programming Manual, May 1, 1972, p. 1-78.

N. Abel et al., ILLIAC IV Doc. No. 233, Language Specifications for a Fortran-Like Higher Level Language for ILLIAV IV, Aug. 28, 1970, p. 1-51.

ILLIAC IV Quarterly Progress Report: Oct., Nov., Dec. 1969; Published Jan. 15, 1970, pp. 1-15.

N.E. Abel et al., Extensions to Fortran for Array Processing (1970) pp. 1-16.

Morris A, Knapp et al.ILLIAC IV Systems Characteristics and Programming Manual (1972) "Bulk Storage Applications in the ILLIAC IV System," p. 1-10.

Rohrbacher, Donald, et al., "Image Processing with the Staran Parallel Computer," IEEE Computer, vol. 10, No. 8, pp. 54-59 (Aug. 1977) (reprinted version pp. 119-124).

Siegel, Howard Jay, "Interconnection Networks for SIMD Machines," IEEE Computer, vol. 12, No. 6, (Jun. 1979) (reprinted version pp. 110-118).

Mike Chastain, et. al., "The Convex C240 Architecture", Conference of Supercomputing, IEEE 1988, p. 321-329.

Gwennap, Linley, "New PA-RISC Processor Decodes MPEG Video: HP's PA-71 00LC Uses New Instructions to Eliminate Decoder Chip," Microprocessor Report, (Jan. 24, 1994) pp. 16-17.

Patrick Knebel et al., "HP's PA7100LC: A Low-Cost Superscalar PARISC Processor," IEEE (1993), pp. 441-447.

Kurpanek et al., "PA7200: A PA-RISC Processor with Integrated High Performance MP Bus Interface," EEEE (1994), pp. 375-382.

Hewlett Packard, PA-RISC 1.1 Architecture and Instruction Set Reference Manual, 3rd ed. Feb. 1994, pp. 1-424.

Margaret Simmons, et. al "A Performance Comparison of Three Supercomputers—Fujitsu VP-2600, NEC SX-3, and Cray Y-MP",. 1991 ACM, p. 150-157.

Smith, J. E., "Dynamic Instruction Scheduling and the Astronautics ZS-1," Computer, vol. 22, No. 7, Jul. 1989, at 21-35 and/or the Astronautics ZS-1 computers made used, and/or sold in the United States, pp. 159-173.

Nikhil et al., "T: A Multithreaded Massively Parallel Architecture" Computation Structures Group Memo 325-2 (Mar. 5, 1992), pp. 1-13.

Undy, et al., "A Low-Cost Graphics and Multimedia Workstation Chip Set," IEEE pp. 10-22 (1994).

Feng, Tse-Yun, "Data Manipulating Functions in Parallel Processors and Their Implementations," IEEE Transactions on Computers, vol. C-23, No. 3, Mar. 1974 (reprinted version pp. 89-98.

Lawrie, Duncan H., "Access and Alignment of Data in an Array Processor," IEEE Transactions on Computers, vol. c-24, No. 12, Dec. 1975 pp. 99-109.

Broomell, George, et al., "Classification Categories and Historical Development of Circuit Switching Topologies," Computing Surveys, vol. 15, No. 2, Jun. 1983 pp. 95-133.

Jain, Vijay, K., "Square-Root, Reciprocal, Sine/Cosine, Arctangent Cell for Signal and Image Processing," IEEEICASSP'94 Apr. 1994, pp. II-521-II-524.

Spaderna et al., "An Integrated Floating Point Vector Processor for DSP and Scientific Computing", 1989 IEEE, ICCD, Oct. 1989 p. 8-13.

Gwennap, Linley, "Digital, MIPS Add Multimedia Extensions," Microdesign Resources Nov. 18, 1996 pp. 24-28.

Toyokura, M., "A Video DSP with a Macroblock-Level-Pipeline and a SIMD Type Vector-Pipeline Architecture for MPEG2 CODEC," ISSCC94, Section 4, Video and Communications Signal Processors, Paper WP 4.5, 1994 pp. 74-75.

Ide, et al., "A 320-MFLOPS CMOS Floating-point Processing Unit for Superscalar Processors," Nobuhiro Ide, et. Al. IEEE Tokyo Section, Denshe Tokyo No. 32, 1993, p. 103-109.

Papadopoulos et al., "*T: Integrated Building Blocks for Parallel Computing," ACM (1993) p. 824- and p. 625-63.5.

Ruby B. Lee, "Accelerating Multimedia with Enhanced Microprocessors," IEEE Micro Apr. 1995 p. 22-32.

Ruby B. Lee, "Realtime MPEG Video Via Software Decompression on a PA-RISC Processor," IEEE (1995), pp. 186-190.

K. Diefendorff ; M. Allen, The Motorola 88110 Superscalar RISC Microprocessor, IEEE Micro, Apr. 1992, p. 157-162.

Kristen Davidson, Declaration of Kristen Davidson, p. 1 and H. Takahashi et al., A 289 MFLOPS Single Chip Vector Processing Unit, The Institute of Electronics, Information, and Communication Engineers Technical Research Report, May 28, 1992, pp. 17-22.

Kristen Davidson, Declaration of Kristen Davidson, p. 1 and M. Kimura et al., Development of Ginicro 32-bit Family of Microprocessors, Fujitsu Semiconductor Special Part 2, vol. 43, No. 2, Feb. 1992.

Bit Manipulator, IBM Technical Disclosure Bulletin, Nov. 1974, pp. 1576-1576 https://www.delphion.com/tdbs/tdb?order=75C+0016.

"Using a Common Barrel Shifter for Operand Normalization, Operand Alignment and Operand Unpack and Pack in Floating Point," IBM Technical Disclosure Bulletin, Jul. 1986, p. 699-701 https://www.delphion.com/tdbs/tdb?order=86A+61578.

Motorola MC88110 Second Generation RISC Microprocessor User's Manual (1991).

Berkerele, Michael J., "Overview of the START (*T) Multithreaded Computer" IEEE Jan. 1993, p. 148-1 56.

Diefendorff, et al., "Organization of the Motorola 88110 Superscalar RISC Microprocessor" IEEE Micro Apr. 1992, p. 39-63.

Barnes, et al., The ILLIAC IV Computer, IEEE Transactions on Computers, vol. C-17, No. 8, Aug. 1968.

Ruby B. Lee et al., Real-Time Software MPEG Video Decoder on Multimedia-Enhanced PA 7 100LC Processors, Hewlett-Packard J. Apr. 1995, p. 60-68.

Ruby B. Lee, "Realtime MPEG Video Via Software Decompression on a PA-RISC Processor," IEEE 1995, p. 186-192.

"The Multimedia Video Processor (MVP): A Chip Architecture for Advanced DSP Applications," Robert J. Gove, IEEE DSP Workshop (1994).

Convex Assembly Language Reference Manual, First Ed., Dec. 1991.

Convex Architecture Reference Manual (C Series), Sixth Edition, Convex Computer Corporation (Apr. 1992).

Manferdelli, et al., "Signal Processing Aspects of the S-1 Multiprocessor Project," submitted to SPIE Annual International Technical Symposium, Sm Diego, Society of Photo Optical Instrumentation Engineers, Jul. 30, 1980, p. 1-8.

Paul Michael Farmwald, Ph.D. "On the Design of High-Performance Digital Arithmetic Units," Thesis, Aug. 1981, p. 1-95.

GsAs Supercomputer Vendors Hit Hard,, Electronic News,Jan. 31, 1994, 1991, pp. 32.

Convex Adds GaAs System, Electronic News, Jun. 20, 1994.

Kevin Wadleigh et al., High-Performance FFT Algorithms for the Convex C4/XA Supercomputer, Journal of Super Computing, vol. 9, pp. 163-178 (1995).

Peter Michielse, Programming the Convex Exemplar Series SPP System, Parallel Scientific Computing, First Intl Workshop, PARA '94, Jun. 20-23, 1994, pp. 375-382.

Ryne, Robert D., "Advanced Computers and Simulation," Los Alamos National Laboratory IEEE 1 993, p. 3229-3233.
Singh et al., "A Programmable HIPPI Interface for a Graphics Supercomputer," ACM (1993) p. 124-132.
Bell, Gordon, "Ultracomputers: A Teraflop Before its Time," Comm. 's of the ACM Aug. 1992 pp. 27-47.
Geist, G. A., "Cluster Computing: The Wave of the Future?" Oak Ridge National Laboratory, 84OR2 1400 May 30, 1994, p. 236-246.
Vetter et al., "Network Supercomputing," IEEE Network May 1992, p. 38-44.
Renwick, John K. "Building a Practical HIPPI LAN," IEEE 1992, p. 355-360.
Tenbrink, et al., "HIPPI: The First Standard for High-Performance Networking," Los Alamos Science 1994 p. 1-4.
Arnould et al., "The Design of Nectar: A Network Backplane for Heterogeneous Multicomputers," ACM 1989 p. 1-12.
Watkins, John, et al., "A Memory Controller with an Integrated Graphics Processor," IEEE 1993 p. 324-336.
Control Data 6400/6500/ 6600 Computer Systems, Instant SMM Maintenance Manual, 1969.
Control Data 6400/6500/ 6600 Computer Systems, Scope Reference Manual, Sep. 1966.
Control Data 6400/6500/ 6600 Computer Systems, Compass Reference Manual, 1969.
Tolmie, Don, "Gigabit LAN Issues: HIPPI, Fibre Channel, or ATM?" Los Alamos National Laboratory Rep. No. LA-UR 94-3994 (1994).
ILLIAC IV: Systems Characteristics and Programming Manual, May 1, 1972.
1979 Annual Report: The S-1 Project vol. 1 Architecture 1979.
1979 Annual Report: The S-1 Project vol. 2 Hardware 1979.
S-1 Uniprocessor Architecture, Apr. 21, 1983 (UCID 19782) See also
S-1 Uniprocessor Architecture (SMA-4), Steven Cornell.
Broughton, et al., The S-1 Project: Top-End Computer Systems for National Security Applications, Oct. 24, 1985.
Convex Data Sheet C4/XA High Performance Programming Environment, Convex Computer Corporation, 1994.
Bowers et al., "Development of a Low-Cost, High Performance, Multiuser Business Server System," Hewlett-Packard J. Apr. 1995 p. 79-84.
Mick Bass et al., The PA 7100LC Microprocessor: A Case Study of Design Decisions in a Competitive Environment Hewlett-Packard J. Apr. 1995, p. 12-18.
Mick Bass, et. al. "Design Methodologies for the PA 7100LC Microprocessor", Hewlett Packard Journal Apr. 1995 p. 23-35.
Wang, Chin-Liang, "Bit-Level Systolic Array for Fast Exponentiation in GF (2Am)," IEEE Transactions on Computers, vol. 43, No. 7, Jul. 1994 p. 838-841.
Markstein, P.W., "Computation of Elementary Functions on the IBM RISC System/6000 Processor," IBM J. Res. Develop., vol. 34, No. 1, Jan. 1990 p. 111-119.
Donovan, Walt, et al., "Pixel Processing in a Memory Controller," IEEE Computer Graphics and Applications, Jan. 1995 p. 51-61.
Ware et al., 64 Bit Monolithic Floating Point Processors, IEEE Journal Of Solid-state Circuits, vol. Sc-17, No. 5, Oct. 1982, pp. 898-907.
Hwang, "Advanced Computer Architecture: Parallelism, Scalability, Programmability" (1 993) at 475, p. 898-907, 1993.
Hwang & Degroot, "Parallel Processing for Supercomputers & Artificial Intelligence," 1993.
Nienhaus, Harry A., "A Fast Square Rooter Combining Algorithmic and Table Lookup Techniques," IEEE Proceedings Southeastcon, 1989 pp. 1103-1105.
Eisig, David, et al., "The Design of a 64-Bit Integer Multiplier/Divider Unit," IEEE 1993 pp. 171-178.
Margulis, Neal, "i860 Microprocessor Architecture," Intel Corporation 1990.
Intel Corporation, 3860 XP Microprocessor Data Book (May 1991).
Hewlett-Packard, "HP 9000 Series 700 Workstations Technical Reference Manual Model 712 (System)" Jan. 1994.
Ruby Lee, et al., Pathlength Reduction Features in the PA-RISC Architecture Feb. 24-28, 1992 p. 129-135.
Kevin Wadleigh et al., High Performance FFT Algorithms for the Convex C4/XA Supercomputer, Poster, Conference on Supercomputing, Washington, D.C., Nov. 1994.

Fields, Scott, "Hunting for Wasted Computing Power: New Software for Computing Networks Puts Idle PC's to Work," Univ. of Wisconsin- Madison 1993 p. 1-8.
Litzkow et al., "Condor—A Hunter of Idle Workstations," IEEE p. 104-111, 1988.
Gregory Wilson, The History of the Development of Parallel Computing http://ei.cs.vt.edu/-history/Parallel.html, p. 1-38, Oct. 29, 1994.
Marsha Jovanovic and Kimberly Claffy, Computational Science: Advances Through Collaboration "Network Behavior" San Diego Supercomputer Center 1993 Science Report, p. 1-11 [http://www.sdsc.edu/Publications/SR93/network_behavior.html].
National Science Foundation (NSF) [www.itrd.gov/pubs/blue94/section.4.2.html] 1994.
Intel Corporation, "Paragon User's Guide" (Oct. 1993).
Turcotte, Louis H., "A Survey of Software Environments for Exploiting Networked Computing Resources" Engineering Research Center for Computational Field Simulation Jun. 11, 1993, p. 1-150.
Patterson, Barbara, "Motorola Announces First High Performance Single Board Computer Using Superscalar Chip" Motorola Computer Group, p. 1-3 [http://badabada.org/misc/mvme197_announce.txt], Aug. 3, 1992.
Culler, David E., et al., "Analysis Of Multithreaded Microprocessors Under Multiprogramming", Report No. UCBICSD 921687, May 1992 p. 1-17.
James Laudon et al., "Architectural And Implementation Tradeoffs In The Design Of Multiple-Context Processors", CSL-TR-92-523, May 1992 p. 1-24.
Ide, et al., "A 320-MFLOPS CMOS Floating-point Processing Unit for Superscalar Processors," 28 IEEE Custom Integrated Circuits Conference, 1992, p. 30.2.1-30.2.4.
High Speed DRAMs, Special Report, IEEE Spectrum, vol. 29, No. 10, Oct. 1992.
Moyer, Steven A., "Access Ordering Algorithms for a Multicopy Memory," IPC-TR-92-0 1 3, Dec. 18, 1992.
Moyer, Steven A., "Access Ordering and Effective Memory Bandwidth," Ph.D. dissertation, University of Virginia, Apr. 5, 1993.
"Hardware Support for Dynamic Access Ordering: Performance of Some Design Options", Sally McKee, Computer Science Report No. CS-93-08, Aug. 9, 1993.
McGee et al., "Design of a Processor Bus Interface ASIC for the Stream Memory Controller" p. 462-465, Apr. 1994.
McKee et al., "Experimental Implementation of Dynamic Access Ordering," Aug. 1, 1993, p. 1-10.
McKee et al., Increasing Memory Bandwidth for Vector Computations, Technical Report CS-93-34 Aug. 1, 1993, p. 1-18.
Sally A. McKee et al., "Access Order and Memory-Conscious Cache Utilization" Computer Science Report No. CS-94- 10, Mar. 1, 1994, p. 1-17.
McKee, et al., "Bounds on Memory Bandwidth in Streamed Computations," Computer Science Report CS-95-32, Mar. 1, 1995.
McKee, Sally A., "Maximizing Memory Bandwidth for Streamed Computations," A Dissertation Presented to the Faculty of the School of Engineering and Applied Science at the University of Virginia, May 1995.
A Systematic Approach to Optimizing and Verifying Synthesized High-Speed ASICs, Trevor Landon, et. Al. , Computer Science Report No. CS-95-51, Dec. 11, 1995.
"Control Data 6400/6500/ 6600 Computer Systems Reference Manuals" 1969 available at http:/led-thelen.org/comp-hist/CDC-6600-R-M.html ("CDC 6600 Manuals").
"Where now for Media processors?", Nick Flaherty, Electronics Times, Aug. 24, 1998.
George H. Barnes et al., The ILLIAC IV Computer[1] , [1]IEEE Trans., C-17 vol. 8, pp. 746-757, Aug. 1968.
J.E. Thornton, Design of a Computer—The Control Data 6600 (1970).
Gerry Kane, PA-RISC 2.0 Architecture, Chp. 6 Instruction Set Overview, Prentice Hall isbn 0-13-182734-0, p. 6-1-6-26, Aug. 1995.
Cosoroaba, A.B., "Synchronous DRAM products revolutionize memory system design," Fujitsu Microelectronics, Southcod95 May 709 1995.
Intel 450KX/GX PCIset, Intetel Corporation, 1996.

Baland, Granito, Marcotte, Messina, Smith, "The IBM System 1360 Model 91 : Storage System" IBM System Journal, Jan. 1967, pp. 54-68.

File History of U.S. Appl. No. 08/340,740, filed Nov. 16, 1994.

File history of U.S. Appl. No. 07/663,314, filed Mar. 1, 1991.

S.S. Reddi et. al. "A Conceptual Framework for Computer Architecture" Computing Surveys,. vol. 8, No. 2, Jun. 1976.

Yulun Wang, et al, The 3DP: A processor Architecture for Three-Dimensional Applications, Jan. 1992, p. 25-36.

"IEEE Draft Standard for High-Bandwidth Memory Interface Based on SCI Signaling Technology (RamLink)", 1995, pp. 1-104, IEEE.

Gerry Kane and Joe Heinrich, "MIPS RISC Architecture" 1992, Publisher: Prentice-Hall Inc., A Simon & Shuster Company, Upper Saddle River New Jersey.

Cathy May et al."The Power PC Architecture: A Specification For A New Family of Risc Processors" Second Edition May 1994, pp. 1-518, Morgan Kaufmann Publishers, Inc. San Francisco CA, IBM International Business Machines, Inc.

"IEEE Standard for Scalable Coherent Interface (SCI)", Published by the Institute of Electrical and Electronics Engineers, Inc. Aug. 2, 2003, pp. 1-248.

Don Tolmie and Don Flanagan, "HIPPI: It's Not Just for Supercomputers Anymore" Data Communications published May 8, 1995.

Kevin D. Kissell "The Dead Supercomputer Society The Passing Of A Golden Age", Feb. 1998 pp. 1-2, [http:/www.paralogos.com/ DeadSuper].

IEEE Draft Standard for "High-Bandwidth Memory Interface Based on SCI Signaling Technology (RamLink)", IEEE Standards Department, Draft 1.25 IEEE P1596.4-199X May 1995.

Joe Heinrich, "MIPS R4000 Microprocessor User's Manual Second Edition"1994 MIPS Technologies, Inc. pp. 1-754.

Litigation proceedings in the matter of *Microunity Systems Engineering, Inc.* v. *Dell, Inc. et al.*, Corrected Preliminary Invalidity Contentions and Exhibits, filed Jan. 12, 2005, Civil Action No. 2:04-CV-120(TJW), U.S. District Court for the Eastern District of Texas Marshall Division.

Ang, StarT Next Generation: Integrating Global Caches and Dataflow Architecture, Proceedings of the ISCA 1992.

Saturn Architecture Specification, published Apr. 29, 1993.

C4/XA Architecture Overview, Convex Technical Marketing presentation dated Nov. 11, 1993 and Feb. 4, 1994.

Convex 3400 Supercomputer System Overview, published Jul. 24, 1991.

Giloi, Parallel Programming Models and Their Interdependence with Parallel Architectures, IEEE Proceedings published Sep. 1993.

PCT International Search Report and Written Opinion dated Mar. 11, 2005, corresponding to PCT/US04/22126.

Supplementary European Search Report dated Mar. 18, 2005, corresponding to Application No. 96928129.4.

IEEE Draft Standard for "Scalable Coherent Interface-Low-Voltage Differential Signal Specifications and Packet Encoding", IEEE Standards Department, P1596.3/D0.15 (Mar. 1992).

IEEE Draft Standard for "High-Bandwidth Memory Interface Based on SCI Signaling Technology (RamLink)," IEEE Standards Department, Draft 1.25 IEEE P1596.4-199X (May 1995).

Gerry Kane et al., "MIPS RISC Architecture," Prenctice Hall (1995).

IBM, "The PowerPC Architecture: A Specification For A New Family of RISC Processors," 2nd Ed., Morgan Kaufmann Publishers, Inc., (1994).

Hewlett-Packard Co., "PA-RISC 1.1 Architecture and Instruction Set," Manual Part No. 09740-90039, (1990).

MIPS Computer Systems, Inc., "MIPS R4000 User's Manual," Mfg. Part No. M8-00040, (1990).

i860™ Microprocessor Architecture, Neal Margulis, Foreword by Les Kohn, 1990.

Gove, "The MVP: A Highly-Integrated Video Compression Chip," IEEE Data Compression Conference, pp. 215-224 (Mar. 1994).

Gove, "The Multimedia Video Processor (MVP): A Chip Architecture for Advanced DSP Applications," IEEE DSP Workshop, pp. 27-30 (Oct. 2-5, 1994).

Guttag et al., "A Single-Chip Multiprocessor for Multimedia: The MVP," IEEE Computer Graphics & Applications, pp. 53-64 (Nov. 1992).

Lee et al., "MediaStation 5000: Integrating Video and Audio," IEEE Multimedia pp. 50-61 (Summer 1994).

TMS320C80 (MVP) Parallel Processor User's Guide, Texas Instruments (Mar. 1995).

TMS320C80 (MVP) Master Processor User's Guide, Texas Instruments (Mar. 1995).

Bass et al., "The PA 7100LC Microprocessor: A Case Study of IC Design Decisions in a Competitive Environment," Hewlett-Packard Journal, vol. 46, No. 2, pp. 12-22 (Apr. 1995).

Bowers et al., "Development of a Low-Cost, High Performance, Multiuser Business Server System," Hewlett-Packard Journal, vol. 46, No. 2, p. 79 (Apr. 1995).

Gwennap, "New PA-RISC Processor Decodes MPEG Video: Hewlett-Packard's PA-7100LC Uses New Instructions to Eliminate Decoder Chip," Microprocessor Report, pp. 16-17 (Jan. 24, 1994).

Gwennap, "Digital MIPS Add Multimedia Extensions," Microdesign Resources, pp. 24-28 (Nov. 18, 1996).

Kurpanek et al., "PA7200: A PA-RISC Processor with Integrated High Performance MP Bus Interface," IEEE COMPCON '94, pp. 375-382 (Feb. 28-Mar. 4, 1994).

Lee et al., "Pathlength Reduction Features in the PA-RISC Architecture," IEEE COMPCON, pp. 129-135 (Feb. 24-28, 1992).

Lee et al., "Real-Time Software MPEG Video Decoder on Multimedia-Enhanced PA 7100LC Processors," Hewlett-Packard Journal, vol. 46, No. 2, pp. 60-68 (Apr. 1995).

Lee, "Realtime MPEG Video via Software Decompression on a PA-RISC Processor," IEEE, pp. 186-192 (1995).

Martin, "An Integrated Graphics Accelerator for a Low-Cost Multimedia Workstation," Hewlett-Packard Journal, vol. 46, No. 2, pp. 43-50 (Apr. 1995).

Undy et al., "A Low-Cost Graphics and Multimedia Workstation Chip Set," IEEE Micro, pp. 10-22 (Apr. 1994).

HP 9000 Series 700 Workstations Technical Reference Manual: Model 712, Hewlett-Packard (Jan. 1994).

PA-RISC 1.1 Architecture and Instruction Set Reference Manual, Third Edition, Hewlett-Packard (Feb. 1994).

.Ang, "StarT Next Generation: Integrating Global Caches and Dataflow Architecture," Proceedings of the ISCA 1992 Dataflow Workshop (1992).

Beckerle, "Overview of the StarT (*T) Multithreaded Computer," IEEE COMPCON '93, pp. 148-156 (Feb. 22-26, 1993).

Diefendorff et al., "The Motorola 88110 Superscalar RISC Microprocessor," IEEE pp. 157-162 (1992).

Gipper, "Designing Systems for Flexibility, Functionality, and Performance with the 88110 Symmetric Superscalar Microprocessor," IEEE (1992).

Nikhil et al., "*T: A Multithreaded Massively Parallel Architecture," Computation Structures Group Memo 325-2, Laboratory for Computer Science, Massachusetts Institute of Technology (Mar. 5, 1992).

Papadopoulos et al., "*T: Integrated Building Blocks for Parallel Computing," ACM, pp. 624-635 (1993).

Patterson, "Motorola Announces First High Performance Single Board Computer Using Superscalar Chip," Motorola Computer Group (Sep. 1992).

M. Phillip, "Performance Issues for 88110 RISC Microprocessor," IEEE, 1992.

M. Smotherman et al., "Instruction Scheduling for the Motorola 88110," IEEE, 1993.

R. Mueller, "The MC88110 Instruction Sequencer," Northcon, 1992.

J. Arends, "88110: Memory System and Bus Interface," Northcon, 1992.

K. Pepe, "The MC88110's High Performance Load/Store Unit," Northcon, 1992.

J. Maguire; "MC88110: Datpath," Northcon, 1992.

Abel et al., "Extensions to FORTRAN for Array Processing," ILLIAC IV Document No. 235, Department of Computer Science, University of Illinois at Urbana-Champaign (Sep. 1, 1970).

Barnes et al., "The ILLIAC IV Computer," IEEE Transactions on Computers, vol. C-17, No. 8, pp. 746-757 (Aug. 1968).

Knapp et al., "Bulk Storage Applications in the ILLIAC IV System," ILLIAC IV Document No. 250, Center for Advanced Computation, University of Illinois at Urbana-Champaign (Aug. 3, 1971).

Awaga et al., "The μVP 64-bit Vector Coprocessor: A New Implementation of High-Performance Numerical Computation," IEEE Micro, vol. 13, No. 5, pp. 24-36 (Oct. 1993).

Takahashi et al., "A 289 MFLOPS Single Chip Vector Processing Unit," The Institute of Electronics, Information, and Communication Engineers Technical Research Report, pp. 17-22 (May 28, 1992).

Uchiyama et al., "The Gmicro/500 Superscalar Microprocessor with Branch Buffers," IEEE Micro (Oct. 1993).

Broughton et al., "The S-1 Project: Top-End Computer Systems for National Security Applications," (Oct. 24, 1985).

Farmwald et al., "Signal Processing Aspects of the S-1 Multiprocessor Project," SPIE vol. 241, Real-Time Signal Processing (1980).

Farmwald, "High Bandwidth Evaluation of Elementary Functions," IEEE Proceedings, 5th Symposium on Computer Arithmetic (1981).

Gilbert, "An Investigation of the Partitioning of Algorithms Across an MIMD Computing System," (Feb. 1980).

Widdoes, "The S-1 Project: Developing High-Performance Digital Computers," IEEE Computer Society COMPCON Spring 1980 (Dec. 11, 1979).

Cornell, S-1 Uniprocessor Architecture SMA-4, 1980.

The S-1 Project, Jan. 1985, S-1 Technical Staff.

S-1 Architecture and Assembler SMA-4 Manual, Dec. 19, 1979 (Preliminary Version).

Michielse, "Performing the Convex Exemplar Series SPP System," Proceedings of Parallel Scientific Computing, First Intl Workshop, PARA '94, pp. 375-382 (Jun. 20-23, 1994).

Wadleigh et al., "High Performance FFT Algorithms for the Convex C4/XA Supercomputer," Poster, Conference on Supercomputing, Washington, D.C. (Nov. 1994).

C4 Technical Overview (Sep. 23, 1993).

Saturn Assembly Level Performance Tuning Guide (Jan. 1, 1994).

Saturn Differences from C Series (Feb. 6, 1994).

"Convex Adds GaAs System," Electronic News (Jun. 20, 1994).

Convex Architecture Reference Manual, Sixth Edition (1992).

Convex Assembly Language Reference Manual, First Edition (Dec. 1991).

Convex Data Sheet C4/XA Systems, Convex Computer Corporation, 1994.

Saturn Overview (Nov. 12, 1993).

Convex Notebook containing various "Machine Descriptions", 1994.

"Convex C4/XA Offer 1 GFLOPS from GaAs Uniprocessor," Computergram International, Jun. 15, 1994.

Excerpt from Convex C4600 Assembly Language Manual, 1995.

Excerpt from "Advanced Computer Architectures—A Design Space Approach," Chapter 14.8, "The Convex C4/XA System", 1997.

Convex C4600 Assembly Language Manual, First Edition, May 1995.

Alvarez et al., "A 450MHz PowerPC Microprocessor with Enhanced Instruction Set and Copper Interconnect," ISSCC (Feb. 1999).

Tyler et al., "AltiVec™: Bringing Vector Technology to the PowerPC™ Processor Family," IEEE (Feb. 1999).

AltiVec™ Technology Programming Environments Manual (1998).

Atkins, "Performance and the i860 Microprocessor," IEEE Micro, pp. 24-27, 72-78 (Oct. 1991).

Grimes et al., "A New Processor with 3-D Graphics Capabilities," NCGA '89 Conference Proceedings vol. 1, pp. 275-284 (Apr. 17-20, 1989).

Grimes et al., "The Intel i860 64-Bit Processor: A General-Purpose CPU with 3D Graphics Capabilities," IEEE Computer Graphics & Applications, pp. 85-94 (Jul. 1989).

Kohn et al., "A 1,000,000 Transistor Microprocessor," 1989 IEEE International Solid-State Circuits Conference Digest of Technical Papers, pp. 54-55, 290 (Feb. 15, 1989).

Kohn et al., "A New Microprocessor with Vector Processing Capabilities," Electro/89 Conference Record, pp. 1-6 (Apr. 11-13, 1989).

Kohn et al., "Introducing the Intel i860 64-Bit Microprocessor," IEEE Micro, pp. 15-30 (Aug. 1989).

Kohn et al., "The i860 64-Bit Supercomputing Microprocessor," AMC, pp. 450-456 (1989).

Margulis, "i860 Microprocessor Architecture," Intel Corporation (1990).

Mittal et al., "MMX Technology Architecture Overview," Intel Technology Journal Q3 '97, pp. 1-12 (1997).

Patel et al., "Architectural Features of the i860—Microprocessor RISC Core and On-Chip Caches," IEEE, pp. 385-390 (1989).

Rhodehamel, "The Bus Interface and Paging Units of the i860 Microprocessor," IEEE, pp. 380-384 (1989).

Perry, "Intel's Secret is Out," IEEE Spectrum, pp. 22-28 (Apr. 1989).

Sit et al., "An 80 MFLOPS Floating-Point Engine in the Intel i860 Processor," IEEE, pp. 374-379 (1989).

i860 XP Microprocessor Data Book, Intel Corporation (May 1991).

Paragon User's Guide, Intel Corporation (Oct. 1993).

N15 Micro Architecture Specification, dated Apr. 29, 1991.

N15 External Architecture Specification, dated Oct. 17, 1990.

N15 External Architecture Specification, dated Dec. 14, 1990.

N15 Product Requirements Document, dated Dec. 21, 1990.

N15 Product Implementation Plan, dated Dec. 21, 1990.

N12 Performance Analysis document version 2.0, dated Sep. 21, 1990.

Hansen, "Architecture of a Broadband Mediaprocessor," IEEE COMPCON 96 (Feb. 25-29, 1996).

Moussouris et al., "Architecture of a Broadband MediaProcessor," Microprocessor Forum (1995).

Amould et al., "The Design of Nectar: A Network Backplane for Heterogeneous Multicomputers," ACM (1989).

Bell, "Ultracomputers: A Teraflop Before Its Time," Communications of the ACM, (Aug. 1992) pp. 27-47.

Broomell et al., "Classification Categories and Historical Development of Circuit Switching Topologies," Computing Surveys, vol. 15, No. 2, pp. 95-133 (Jun. 1983).

Culler et al., "Analysis of Multithreaded Microprocessors Under Multiprogramming," Report No. UCB/CSD 92/687 (May 1992).

Donovan et al., "Pixel Processing in a Memory Controller," IEEE Computer Graphics and Applications, pp. 51-61 (Jan. 1995).

Fields, "Hunting for Wasted Computing Power: New Software for Computing Networks Puts Idle PC's to Work," Univ. of Wisconsin-Madison, http://www.cs.wisc.edu/condor/doc/WiscIdea.html (1993).

Geist, "Cluster Computing: The Wave of the Future?," Oak Ridge National Laboratory, 84OR21400 (May 30, 1994).

Ghafoor, "Systolic Architecture for Finite Field Exponentiation," IEEE Proceedings, vol. 136 (Nov. 1989).

Giloi, "Parallel Programming Models and their Interdependence with Parallel Architectures," IEEE Proceedings (Sep. 1993).

Hwang et al., "Parallel Processing for Supercomputers and Artificial Intelligence," (1993).

Hwang, "Advanced Computer Architecture: Parallelism, Scalability, Programmability," (1993).

Hwang, "Computer Architecture and Parallel Processing," McGraw Hill (1984).

Iwaki, "Architecture of a High Speed Reed-Solomon Decoder," IEEE Consumer Electronics (Jan. 1994).

Jain et al., "Square-Root, Reciprocal, Sine/Cosine, Arctangent Cell for Signal and Image Processing," IEEE ICASSP '94, pp. II-521-II-524 (Apr. 1994).

Laudon et al., "Architectural and Implementation Tradeoffs in the Design of Multiple-Context Processors," Technical Report: CSL-TR-92-523 (May 1992).

Lawrie, "Access and Alignment of Data in an Array Processor," IEEE Transactions on Computers, vol. C-24, No. 12, pp. 99-109 (Dec. 1975).

Le-Ngoc, "A Gate-Array-Based Programmable Reed-Solomon Codec: Structure-Implementation-Applications," IEEE Military Communications (1990).

Litzkow et al., "Condor—A Hunter of Idle Workstations," IEEE (1988).

Markstein, "Computation of Elementary Functions on the IBM RISC System/6000 Processor," IBM J. Res. Develop., vol. 34, No. 1, pp. 111-119 (Jan. 1990).

Nienhaus, "A Fast Square Rooter Combining Algorithmic and Table Lookup Techniques," IEEE Proceedings Southeastcon, pp. 1103-1105 (1989).

Renwick, "Building a Practical HIPPI LAN," IEEE, pp. 355-360 (1992).
Rohrbacher et al., "Image Processing with the Staran Parallel Computer," IEEE Computer, vol. 10, No. 8, pp. 54-59 (Aug. 1977) (reprinted version pp. 119-124).
Ryne, "Advanced Computers and Simulation," IEEE, pp. 3229-3233 (1993).
Siegel, "Interconnection Networks for SIMD Machines," IEEE Computer, vol. 12, No. 6 (Jun. 1979) (reprinted version pp. 110 118).
Singh et al., "A Programmable HIPPI Interface for a Graphics Supercomputer," ACM (1993).
Smith, "Cache Memories," Computing Surveys, vol. 14, No. 3 (Sep. 1982).
Tenbrink et al., "HIPPI: The First Standard for High-Performance Networking," Los Alamos Science (1994).
Tolmie, "Gigabit LAN Issues: HIPPI, Fibre Channel, or ATM," Los Alamos National Laboratory Report No. LA-UR 94-3994 (1994).
Tolmie, "HIPPI: It's Not Just for Supercomputers Anymore," Data Communications (May 8, 1995).
Toyokura et al., "A Video DSP with a Macroblock-Level-Pipeline and a SIMD Type Vector-Pipelined Architecture for MPEG2 CODEC," ISSCC94, Section 4, Video and Communications Signal Processors, Paper WP 4.5, pp. 74-75 (1994).
Tullsen et al., "Simultaneous Multithreading: Maximizing On-Chip Parallelism," Proceedings of the 22nd Annual International Symposium on Computer Architecture (Jun. 1995).
Turcolte, "A Survey of Software Environments for Exploiting Networked Computing Resources," Engineering Research Center for Computational Field Simulation (Jun. 11, 1993).
Vetter et al., "Network Supercomputing: Connecting Cray Supercomputers with a HIPPI Network Provides Impressively High Execution Rates," IEEE Network (May 1992).
Wang, "Bit-Level Systolic Array for Fast Exponentiation in GF(2m)," IEEE Transactions on Computers, vol. 43, No. 7, pp. 838-841 (Jul. 1994).
Ware et al., "64 Bit Monolithic Floating Point Processors," IEEE Journal of Solid-State Circuits, vol. Sc-17, No. 5 (Oct. 1982).
"Bit Manipulator," IBM Technical Disclosure Bulletin, pp. 1575-1576 (Nov. 1974).
Finney et al., "Using a Common Barrel Shifter for Operand Normalization, Operand Alignment and Operand Unpack and Pack in Floating Point," IBM Technical Disclosure Bulletin, pp. 699-701 (Jul. 1986).
Data General AViiON AV500, 550, 4500 and 5500 Servers, no date available.
Jovanovic et al., "Computational Science: Advances Through Collaboration," San Diego Supercomputer Center Science Report (1993).
High Performance Computing and Communications: Toward a National Information Infrastructure, National Science Foundation (NSF) (1994).
National Coordination Office for High Performance Computing and Communications, "High Performance Computing and Communications: Foundation for America's Information Future" (1996).
Wilson, "The History of the Development of Parallel Computing," http://ei.cs.vt.edu/~history/Parallel.html, Oct. 28, 1999.
IEEE Standard 754 (ANSI/IEEE Std. 754-1985).
Original Complaint for Patent Infringement, *MicroUnity Systems Engineering, Inc. v. Dell, Inc. f/k/a/ Dell Computer and Intel Corporation*; C.A. No. 2-04CV-120: In the United Sates District Court of the Eastern District of Texas, Marshall Division filed Mar. 26, 2004.
Amended Complaint for Patent Infringement, *MicroUnity Systems Engineering, Inc. v. Dell, Inc. f/k/a/ Dell Computer and Intel Corporation*; C.A. No. 2-04CV-120; In the United States District Court of the Eastern District of Texas, Marshall Division filed Apr. 20, 2004.
Expert Witness Report of Richard A. Killworth, Esq., *MicroUnity Systems Engineering, Inc. v. Dell, Inc. f/k/a/ Dell Computer and Intel Corporation*; C.A. No. 2-04CV-120; In the United States District Court of the Eastern District of Texas, Marshall Division filed Sep. 12, 2005.
Declaration and Expert Witness Report of Ray Mercer Regarding Written Description and Enablement Issues, *MicroUnity Systems Engineering, Inc. v. Dell, Inc. f/k/a/ Dell Computer and Intel Corporation*; C.A. No. 2-04CV-120; In the United States District Court of the Eastern District of Texas, Marshall Division filed Sep. 12, 2005.
Corrected Expert Report of Dr. Stephen B. Wicker Regarding Invalidity of U.S. Patent Nos. 5,742,840; 5,794,060; 5,764,061; 5,809,321; 6,584,482; 6,643,765; 6,725,356 and Exhibits A-I; *MicroUnity Systems Engineering, Inc. v. Dell, Inc. f/k/a/ Dell Computer and Intel Corporation*; C.A. No. 2-04CV-120; In the United States District Court of the Eastern District of Texas, Marshall Division filed Oct. 6, 2005.
Defendants Intel and Dell's Invalidity Contentions with Exhibits A-G; *MicroUnity Systems Engineering, Inc. v. Dell, Inc. f/k/a/ Dell Computer and Intel Corporation*; C.A. No. 2-04CV-120; In the United States District Court of the Eastern District of Texas, Marshall Division filed Sep. 19, 2005.
Defendants Dell Inc. and Intel Corporation's Identification of Prior Art Pursuant to 35 USC §282; *MicroUnity Systems Engineering, Inc. v. Dell, Inc. f/k/a/ Dell Computer and Intel Corporation*; C.A. No. 2-04CV-120; In the United States District Court of the Eastern District of Texas, Marshall Division filed Oct. 7, 2005.
Request for *Inter Partes* Reexamination Under 35 USC §§ 311-318 of U.S. Patent No. 6,725,356 filed on Jun. 28, 2005.
Deposition of Larry Mennemeier on Sep. 22, 2005 and Exhibit 501; *MicroUnity Systems Engineering, Inc. v. Dell, Inc. f/k/a/ Dell Computer and Intel Corporation*; C.A. No. 2-04CV-120; In the United States District Court of the Eastern District of Texas, Marshall Division.
Deposition of Leslie Kohn on Sep. 22, 2005; *MicroUnity Systems Engineering, Inc. v. Dell, Inc. f/k/a/ Dell Computer and Intel Corporation*; C.A. No. 2-04CV-120; In the United States District Court of the Eastern District of Texas, Marshall Division.
Intel Article, "*Intel Announces Record Revenue of 9.96 Billion*", Oct. 18, 2005.
The New York Times Article, "*Intel Posts 5% Profit Increase on Demand for Notebook Chips*", Oct. 19, 2005.
USA Today Article, "*Intel's Revenue Grew 18% In Robust Quarter for Tech*", Oct. 19, 2005.
The Wall Street Journal Article, "*Intel Says Chip Demand May Slow*", Oct. 19, 2005.
The New York Times Article, "*Intel Settlement Revives A Fading Chip Designer*", Oct. 20, 2005.
Markoff, John, "Intel Settlement Revives a Fading Chip Designer," The New York Times (Oct. 20, 2005).
Intel Press Release, "Intel Announces Record Revenue of $9.96 Billion," Santa Clara, CA, Oct. 18, 2005.
*MU v. SCEA* Nov. 2, 2005 Complaint for Patent Infringement (*MicroUnity Systems Engineering, Inc. v. Sony Computer Entertainment America, Inc.*; 2;05-cv-505; USDC for the Eastern District of Texas, Marshall Division).
Feb. 14, 2006 SCEA's Answer, Affirmative Defenses, and Counterclaim to MicroUnity's Original Complaint (*MicroUnity Systems Engineering, Inc. v. Sony Computer Entertainment America, Inc.*; 2:05-cv-505; USDC for the Eastern District of Texas, Marshall Division).
Mar. 5, 2007 SCEA's Invalidity Contentions & Exhibits A-I (Exhibits G-9 and H-9 previously marked Outside Counsel Eyes Only, but now released) (*MicroUnity Systems Engineering, Inc. v. Sony Computer Entertainment America, Inc.*; 2:05-cv-505; USDC for the Eastern District of Texas, Marshall Division).
May 1, 2007 SCEA's Supplemental Invalidity Contentions & Exhibits A-1 (Exhibits A-2, E-2, F-2, G-9 and H-7 previously marked Outside Counsel Eyes Only, but now released) (*MicroUnity Systems Engineering, Inc. v. Sony Computer Entertainment America, Inc.*; 2:05-cv-505; USDC for the Eastern District of Texas, Marshall Division).
Jul. 11, 2007 P.R. 4-3 Joint Claim Construction Statement (*MicroUnity Systems Engineering, Inc. v. Sony Computer Entertainment America, Inc.*, 2:05-cv-505, U.S.D.C., E.D. Texas, Marshall Division).
Aug. 24, 2007 MU's LRP 4-5(a) Opening Brief on Claim Construction, and Exhibits 1-14 (*MicroUnity Systems Engineering, Inc. v. Sony Computer Entertainment America, Inc.*, 2:05-cv-505, U.S.D. C., E.D. Texas, Marshall Division).

Sep. 12, 2007 SCEA's Responsive Brief Regarding Claim Construction Pursuant to P.R. 4-5(b), and Exhibits 1-34 (*MicroUnity Systems Engineering, Inc.* v. *Sony Computer Entertainment America, Inc.*, 2:05-cv-505, U.S.D.C., E.D. Texas, Marshall Division).

Sep. 17, 2007 LPR 4-5(c) Reply Brief on Claim Construction from MicroUnity Systems Engineering, Inc., and Exhibits 15 and 16 (*MicroUnity Systems Engineering, Inc.* v. *Sony Computer Entertainment America, Inc.*, 2:05-cv-505, U.S.D.C., E.D. Texas, Marshall Division).

Sep. 20, 2007 Transcript of Claim Construction Hearing Before the Honorable T. John Ward United States District Judge (*MicroUnity Systems Engineering, Inc.* v. *Sony Computer Entertainment America, Inc.*, 2:05-cv-505, U.S.D.C., E.D. Texas, Marshall Division).

Oct. 15, 2007 SCEA's Motion for Partial Summary Judgment of Invalidity for U.S. Patent Nos. 6,643,765 and 6,725,356, and Proposed Order, and Exhibits A-U (*MicroUnity Systems Engineering, Inc.* v. *Sony Computer Entertainment America, Inc.*, 2:05-cv-505, U.S.D.C., E.D. Texas, Marshall Division).

Oct. 29, 2007 MU's Response Brief in Opposition to Sony's Motion for Partial Summary Judgment of Invalidity of U.S. Patent Nos. 6,643,765 and 6,725,356, and Proposed Order (*MicroUnity Systems Engineering, Inc.* v. *Sony Computer Entertainment America, Inc.*, 2:05-cv-505, U.S.D.C., E.D. Texas, Marshall Division).

Oct. 29, 2007 Declaration of Michael Heim in Support of MU's Response Brief in Opposition to Sony's Motion for Partial Summary Judgment of Invalidity of U.S. Patent Nos. 6,643,765 and 6,725,356, and Exhibits A-P (*MicroUnity Systems Engineering, Inc.* v. *Sony Computer Entertainment America, Inc.*, 2:05-cv-505, U.S.D.C., E.D. Texas, Marshall Division).

Nov. 6, 2007 Order Granting Joint Motion to Stay Litigation Pending Settlement (*MicroUnity Systems Engineering, Inc.* v. *Sony Computer Entertainment America, Inc.*, 2:05-cv-505, U.S.D.C., E.D. Texas, Marshall Division.

Dec. 12, 2007 Order of Dismissal with Prejudice and Final Judgment (*MicroUnity Systems Engineering, Inc.* v. *Sony Computer Entertainment America, Inc.*, 2:05-cv-505, U.S.D.C., E.D. Texas, Marshall Division).

*MU* v. *AMD* Nov. 22, 2006 Complaint Against Advanced Micro Devices, Inc. and Exhibits A-L (*MicroUnity Systems Engineering, Inc.* v. *Advanced Micro Devices, Inc.*; 2:06-cv-486; USDC for the Eastern District of Texas, Marshall Division).

Feb. 26, 2007 AMD's Answer to MicroUnity's Complaint (*MicroUnity Systems Engineering, Inc.* v. *Advanced Micro Devices, Inc.*; 2:06-cv-486; USDC for the Eastern District of Texas, Marshall Division).

Aug. 6, 2007 AMD's Invalidity Contentions Under Patent Rule 3-3, and Exhibits A-I (*MicroUnity Systems Engineering, Inc.* v. *Advanced Micro Devices, Inc.*, 2:06-cv-486, U.S.D.C., E.D. Texas, Marshall Division).

Sep. 5, 2007 AMD's Supplemental and Consolidated Invalidity Contentions—LPR 3-3, and Exhibits A-L (*MicroUnity Systems Engineering, Inc.* v. *Advanced Micro Devices, Inc.*, 2:06-cv-486, U.S.D.C., E.D. Texas, Marshall Division).

Jan. 8, 2008 Order of Dismissal With Prejudice and Final Judgment (*MicroUnity Systems Engineering, Inc.* v. *Advanced Micro Devices, Inc.*, 2:06-cv-486, U.S.D.C., E.D. Texas, Marshall Division).

*MU* v. *Dell & Intel* Feb. 25, 2005 Defendant Dell Inc.'s Amended Answer, Affirmative Defenses, and Counterclaims to Plaintiff's First Amended Complaint (*MicroUnity Systems Engineering, Inc.* v. *Dell, Inc. f/k/a/ Dell Computer and Intel Corporation*; C.A. No. 2-04-cv-120; U.S.D.C., E.D. Texas, Marshall Division).

Feb. 25, 2005 Defendant Intel Corporation's Amended Answer, Affirmative Defenses, and Counterclaims to Plaintiff's First Amended Complaint (*MicroUnity Systems Engineering, Inc.* v. *Dell, Inc. f/k/a/ Dell Computer and Intel Corporation*; C.A. No. 2-04-cv-120; U.S.D.C., E.D. Texas, Marshall Division).

Apr. 11, 2005 MicroUnity Systems Engineering, Inc.'s Opening Brief Regarding Claim Construction Pursuant to Patent Local Rule 4-5(a) and Exhibits A-I (*MicroUnity Systems Engineering, Inc.* v. *Dell, Inc. f/k/a/ Dell Computer and Intel Corporation*; C.A. No. 2-04-cv-120; U.S.D.C., E.D. Texas, Marshall Division).

Apr. 26, 2005 Supplement to Plaintiff MicroUnity Systems Engineering, Inc.'s Opening Brief Regarding Claim Construction (submitting a corrected p. 41) (*MicroUnity Systems Engineering, Inc.* v. *Dell, Inc. f/k/a/ Dell Computer and Intel Corporation*; C.A. No. 2-04-cv-120; U.S.D.C., E.D. Texas, Marshall Division).

May 12, 2005 Dell, Inc. and Intel Corporation's Responsive Brief Regarding Claim Construction Pursuant to Patent Local Rule 4-5(b) (*MicroUnity Systems Engineering, Inc.* v. *Dell, Inc. f/k/a/ Dell Computer and Intel Corporation*; C.A. No. 2-04-cv-120; U.S.D.C., E.D. Texas, Marshall Division).

Jun. 9, 2005 Intel and Dell's Surreply Brief Regarding Claim Construction (*MicroUnity Systems Engineering, Inc.* v. *Dell, Inc. f/k/a/ Dell Computer and Intel Corporation*; C.A. No. 2-04-cv-120; U.S.D.C., E.D. Texas, Marshall Division).

*The AMD-K6 3D Processor: Revolutionary Multimedia Performance*, Ed. H. Kalish and J. Isaac, Abacus (1998).

BIT Data Sheet—Product Summary: B3110/B3120/B2110/B2120 Floating Point Chip Set, Bipolar Integrated Technology, Inc. (Dec. 1986).

BSP, Burroughs Scientific Processor, Burroughs Corporation, 1-29 (Jun. 1977).

BSP and BSP Customer Attributes: Inclosure 5, Burroughs Corporation, 1-3 (Aug. 1, 1977).

BSP Floating Point Arithmetic, Burroughs Corporation, 1-27 (Dec. 1978).

Colwell et al., "Architecture and Implementation of a VLIW Supercomputer," IEEE, 910-19 (1990).

Colwell et al., "A VLIW Architecture for a Trace Scheduling Compiler," *IEEE Transactions on Computers*, vol. 37, No. 8, 967-79 (Aug. 1988).

Foley, "The Mpact™ Media Processor Redefines the Multimedia PC," *Proceedings of COMPCON Spring '96*, IEEE, 311-18 (1996).

Gajski et al., "Design of Arithmetic Elements for Burroughs Scientific Processor," *Proceedings of the 4th Symposium on Computer Arithmetic*, Santa Monica, CA, 245-56 (1978).

Hansen, "MicroUnity's MediaProcessor Architecture," *IEEE Micro* (1996).

Hwang et al., *Computer Architecture and Parallel Processing*, McGraw Hill Book Co., Singapore (1988) (7 pages).

"Intel MMX™ Technology Overview," Intel Corp. (Mar. 1996).

Kuck et al., "The Burroughs Scientific Processor (BSP)," *IEEE Transactions on Computers*, vol. C-31, No. 5, 363-76 (May 1982).

Lion Extension Architecture (Oct. 12, 1991).

Lowney et al., "The Multiflow Trace Scheduling Compiler," (Oct. 30, 1992).

"MIPS Digital Media Extension" (MDMX), rev. 1.0, C-1 to C-40, 1997.

"Multimedia Extension Unit for the X86 Architecture," Compaq Computer Corp., Revision 0.8b (Jun. 20, 1995).

Rathnam et al., "An Architectural Overview of the Programmable Multimedia Processor, TM-1," *Proceedings of COMPCON '96*, IEEE (Spring 1996).

Rubinfeld, et al., "Motion Video Instruction Extensions for Alpha," Semiconductor Eng'g Group (Oct. 18, 1996).

Shanley, *Pentium Pro Processor System Architecture*, MindShare, Inc., Addison-Wesley Developers Press (1997).

Slater, "MicroUnity Lifts Veil on MediaProcessor," *Microprocessor Report* (Oct. 23, 1995).

TM1000 Preliminary Data Book, TriMedia Product Group (1997).

"TRACE/300 Series: F Board Architecture," Multiflow Computer (Dec. 9, 1988).

X86 64-Bit Extension Multimedia Instruction Set Architecture, *Intel 64-bit Multimedia ISA Ratification Summit* (Apr.-May 1992) [SCEA-1423558-655] (*Previously marked Confidential—Counsel Eyes Only, but released for submission*).

Office Action dated Feb. 17, 1998 received in related U.S. Appl. No. 08/857,596, now U.S. Patent No. 5,953,241.

Response filed Aug. 17, 1998 in response to Office Action dated Feb. 17, 1998 in related U.S. Appl. No. 08/857,596, now U.S. Patent No. 5,953,241.

Gwennap, "UltraSPARC Adds Multimedia Instructions," Microprocessor Report (Dec. 5, 1994).

Extended European Search Report dated Feb. 18, 2008 re Application No./Patent No. 07111351.8-1243.

Diefendorff et al., "The PowerPC User Instruction Set Architecture," *IEEE Micro*, No. 5, 30-41 (Oct. 1994) [XP000476678].

Greenley et al., "UltraSPARC™: The Next Generation Superscaler 64-bit SPARC," IEEE, 442-51 (1995) [XP000545452].

Laudon et al., "Interleaving: A Multithreading Technique Targeting Multiprocessors and Workstations," ACM Sigplan Notices, No. 11, 308-18 (Nov. 29, 1994) [XP000491743].

"MC88110 RISC Microprocessor User's Manual, Second Edition," Motorola, Inc. (1990), Sections 1 through 3 (148 pages) [XP002474804].

Sato et al., "Multiple Instruction Streams in a Highly Pipelined Processor," IEEE, 182-89 (1990) [XP010021363].

Yamamoto et al., "Performance Estimation of Multistreamed, Superscaler Processors," IEEE, 195-204 (1994) [XP010096943].

Zhou et al., "MPEG Video Decoding with the UltraSPARC Visual Instruction Set," IEEE, 470-75 (1995) [XP002472254].

P27838EP-D1-PCT Extended European Search Report dated May 2, 2008 in Application No. / Patent No. 07111352.6-1243.

P27838EP-D4-PCT Extended European Search Report dated May 8, 2008 in Application No. / Patent No. 07111349.2-1243.

P27838EP-D5-PCT Extended European Search Report dated Apr. 23, 2008 in Application No. / Patent No. 07111344.3-1243.

P27838EP-D6-PCT Partial European Search Report dated Apr. 1, 2008 in Application No. / Patent No. 07111348.4-1243.

P27838EP-D7-PCT Extended European Search Report dated Mar. 10, 2008 in Application No. / Patent No. 07111473.0-1243.

P27838EP-D8-PCT Extended European Search Report dated May 27, 2008 in Application No. / Patent No. 07111476.3-1243.

P27838EP-D9-PCT Extended European Search Report dated Mar. 26, 2008 in Application No. / Patent No. 07111480.5-1243.

U.S. Appl. No. 10/436,340 Continuation Application filed May 13, 2003.

U.S. Appl. No. 10/436,340 First Office Action dated Feb. 9, 2006.

U.S. Appl. No. 10/436,340 First Office Action Response filed Jul. 10, 2006.

U.S. Appl. No. 10/436,340 Notice of Allowance and Issue Fee Due dated Oct. 3, 2006.

U.S. Appl. No. 10/436,340 Response to Notice of Allowance and RCE filed Nov. 14, 2006.

U.S. Appl. No. 10/436,340 Second Office Action dated Feb. 21, 2007.

U.S. Appl. No. 10/436,340 Second Office Action Response filed Aug. 21, 2007.

U.S. Appl. No. 10/436,340 Declaration of Korbin Van Dyke filed Aug. 21, 2007.

U.S. Appl. No. 10/436,340 Third Office Action dated Nov. 21, 2007.

U.S. Appl. No. 10/436,340 Third Office Action Response filed Mar. 21, 2008.

U.S. Appl. No. 10/436,340 Third Office Action Response Supplemental filed Apr. 18, 2008.

7,216,217 (U.S. Appl. No. 10/646,787) Continuation Application filed Aug. 25, 2003.

7,216,217 (U.S. Appl. No. 10/646,787) Preliminary Amendment filed Dec. 23, 2003.

7,216,217 (U.S. Appl. No. 10/646,787) First Office Action dated May 9, 2005.

7,216,217 (U.S. Appl. No. 10/646,787) First Office Action Response filed Nov. 9, 2005.

7,216,217 (U.S. Appl. No. 10/646,787) Second Office Action dated Jan. 12, 2006.

7,216,217 (U.S. Appl. No. 10/646,787) Second Office Action Response filed May 11, 2006.

7,216,217 (U.S. Appl. No. 10/646,787) Notice of Allowance dated Jun. 2, 2006.

7,216,217 (U.S. Appl. No. 10/646,787) Issue Notification Apr. 18, 2007.

U.S. Appl. No. 10/757,836 Continuation Application filed Jan. 16, 2004.

U.S. Appl. No. 10/757,836 Preliminary Amendment filed May 14, 2004.

U.S. Appl. No. 10/757,836 Preliminary Amendment filed Jun. 18, 2004.

U.S. Appl. No. 10/757,836 First Office Action dated Jun. 19, 2006.

U.S. Appl. No. 10/757,836 First Office Action Response filed Sep. 10, 2006.

U.S. Appl. No. 10/757,836 Notice of Allowance and Fees Due dated Nov. 28, 2007.

U.S. Appl. No. 10/757,836 Request for Continued Examination filed Feb. 27, 2008.

U.S. Appl. No. 10/757,836 Second Office Action dated Jun. 6, 2008.

U.S. Appl. No. 10/757,836 Second Office Action Response filed Jun. 26, 2008.

U.S. Appl. No. 10/757,851 Continuation Application filed Jan. 16, 2004.

U.S. Appl. No. 10/757,851 Preliminary Amendment filed May 14, 2004.

U.S. Appl. No. 10/757,851 Preliminary Amendment filed Jun. 18, 2004.

U.S. Appl. No. 10/757,851 First Office Action dated May 23, 2006.

U.S. Appl. No. 10/757,851 First Office Action Response filed Nov. 21, 2006.

U.S. Appl. No. 10/757,851 Second Office Action dated Feb. 21, 2007.

U.S. Appl. No. 10/757,851 Second Office Action Response filed Aug. 21, 2007.

U.S. Appl. No. 10/757,851 Notice of Allowance and Issue Fees Due dated Nov. 16, 2007.

U.S. Appl. No. 10/757,851 Notice of Allowance and Issue Fees Due dated Feb. 12, 2008.

U.S. Appl. No. 10/757,851 Request for Continued Examination filed Feb. 19, 2008.

U.S. Appl. No. 10/757,851 Third Office Action dated May 9, 2008.

U.S. Appl. No. 10/757,851 Third Office Action Response filed Jun. 26, 2008.

U.S. Appl. No. 11/511,466 Continuation Application filed Aug. 29, 2006.

U.S. Appl. No. 11/511,466 Preliminary Amendment filed Aug. 29, 2006.

U.S. Appl. No. 11/878,803 Continuation Application filed Jul. 27, 2007.

U.S. Appl. No. 11/878,804 Continuation Application filed Jul. 27, 2007.

U.S. Appl. No. 11/878,805 Continuation Application filed Jul. 27, 2007.

U.S. Appl. No. 11/878,814 Continuation Application filed Jul. 27, 2007.

5,742,840 (U.S. Appl. No. 08/516,036) Transmittal of Application filed Aug. 16, 1995.

5,742,840 (U.S. Appl. No. 08/516,036) First Office Action dated Oct. 15, 1996.

5,742,840 (U.S. Appl. No. 08/516,036) First Office Action Response filed Nov. 14, 1996.

5,742,840 (U.S. Appl. No. 08/516,036) Second Office Action dated Jan. 28, 1997.

5,742,840 (U.S. Appl. No. 08/516,036) Second Office Action Response dated May 28, 1997.

5,742,840 (U.S. Appl. No. 08/516,036) Examiner Interview Summary dated Aug. 4, 1997.

5,742,840 (U.S. Appl. No. 08/516,036) Notice of Allowance and Issue Fee Due dated Aug. 4, 1997.

5,742,840 (Control No. 90/007,583) Reexam Request filed Jun. 13, 2005.

5,742,840 (Control No. 90/007,583) Office Action Granting Reexam dated Jul. 13, 2005.

5,742,840 (Control No. 90/007,583) First Office Action dated Dec. 22, 2006.

5,742,840 (Control No. 90/007,583) First Office Action Response filed Feb. 22, 2007.

5,742,840 (Control No. 90/007,583) Examiner Interview Summary dated Jun. 13, 2007.

5,742,840 (Control No. 90/007,583) Response to Examiner Interview Summary filed Jun. 22, 2007.

5,742,840 (Control No. 90/007,583) Office Action (Final) dated Aug. 9, 2007.

5,742,840 (Control No. 90/007,583) Final Office Action Response filed Oct. 9, 2007.

5,742,840 (Control No. 90/007,583) Dr. V. Thomas Rhyne Declaration dated Oct. 4, 2007.
5,742,840 (Control No. 90/007,583) Examiner Interview Summary dated Jan. 28, 2008.
5,742,840 (Control No. 90/007,583) Response to Examiner Interview Summary filed Feb. 28, 2008.
5,794,060 (U.S. Appl. No. 08/754,826) Divisional Application under C.F.R. 1.60 filed Nov. 22, 1996.
5,794,060 (U.S. Appl. No. 08/754,826) First Office Action dated Oct. 23, 1997.
5,794,060 (U.S. Appl. No. 08/754,826) First Office Action Response filed Feb. 11, 1998.
5,794,060 (U.S. Appl. No. 08/754,826) Examiner Interview Summary dated Apr. 28, 1998.
5,794,060 (U.S. Appl. No. 08/754,826) Notice of Allowance and Issue Fee Due dated Apr. 28, 1998.
5,794,060 (U.S. Appl. No. 08/754,826) Notice of *Ex Parte* Reexamination dated Jun. 17, 2005 (90/007,593).
5,794,060 (Control No. 90/007,593) Reexam Request Filed Jun. 17, 2005.
5,794,060 (Control No. 90/007,593) Office Action Granting Reexam dated Jul. 12, 2005.
5,794,060 (Control No. 90/007,593) First Office Action dated Dec. 22, 2006.
5,794,060 (Control No. 90/007,593) First Office Action Response filed Feb. 22, 2007.
5,794,060 (Control No. 90/007,593) Office Action (Final) dated Sep. 1, 2007.
5,794,060 (Control No. 90/007,593) Office Action Response filed Nov. 1, 2007.
5,794,060 (Control No. 90/007,593) Amendment Entered by Examiner dated Apr. 30, 2008.
5,794,060 (Control No. 90/007,593) Office Action dated May 6, 2008.
5,794,060 (Control No. 90/007,593) Office Action response filed Jul. 7, 2008.
5,794,060 (Control No. 90/007,593) Declaration of Dr. John Moussouris dated Jul. 3, 2008.
5,794,060 (Control No. 90/007,593) Declaration of Craig Hansen dated Jul. 7, 2008.
5,794,061 (U.S. Appl. No. 08/754,829) Divisional Application under C.F.R. 1.60 filed Nov. 22, 1996.
5,794,061 (U.S. Appl. No. 08/754,829) First Office Action dated Sep. 11, 1997.
5,794,061 (U.S. Appl. No. 08/754,829) First Office Action Response filed Feb. 11, 1998.
5,794,061 (U.S. Appl. No. 08/754,829) Notice of Allowance and Issue Fee Due dated Apr. 28, 1998.
5,794,061 (U.S. Appl. No. 08/754,829) Notice of *Ex Parte* Reexamination dated May 26, 2005 (90/007,563).
5,794,061 (Control No. 90/007,563) Reexam Request Filed May 26, 2005.
5,794,061 (Control No. 90/007,563) Office Action Granting Reexam dated Jul. 7, 2005.
5,794,061 (Control No. 90/007,563) First Office Action dated Dec. 22, 2006.
5,794,061 (Control No. 90/007,563) First Office Action Response filed Feb. 22, 2007.
5,794,061 (Control No. 90/007,563) Dr. John Moussouris Declaration dated Feb. 22, 2007.
5,794,061 (Control No. 90/007,563) Craig Hansen Declaration dated Feb. 22, 2007.
5,794,061 (Control No. 90/007,563) Examiner Interview Summary dated Jun. 13, 2007.
5,794,061 (Control No. 90/007,563) Response to Examiner Interview Summary dated Jun. 22, 2007.
5,794,061 (Control No. 90/007,563) Office Action (Final) dated Sep. 1, 2007.
5,794,061 (Control No. 90/007,563) Office Action Response filed Nov. 1, 2007.
5,794,061 (Control No. 90/007,563) Dr. V. Thomas Rhyne Declaration dated Oct. 4, 2007.
5,794,061 (Control No. 90/007,563) Dr. John Moussouris Declaration dated Nov. 1, 2007.
5,794,061 (Control No. 90/007,563) Korbin Van Dyke Declaration dated Nov. 1, 2007.
6,584,482 (U.S. Appl. No. 09/377,182) Continuation Application under 37 C.F.R. 1.53(b) filed Aug. 19, 1999.
6,584,482 (U.S. Appl. No. 09/377,182) Preliminary Amendment filed Sep. 20, 1999.
6,584,482 (U.S. Appl. No. 09/377,182) First Office Action dated Aug. 8, 2002.
6,584,482 (U.S. Appl. No. 09/377,182) First Office Action Response (draft) filed Jan. 13, 2003.
6,584,482 (U.S. Appl. No. 09/377,182) Examiner Interview Summary dated Jan. 16, 2003.
6,584,482 (U.S. Appl. No. 09/377,182) First Office Action Response filed Feb. 4, 2003.
6,584,482 (U.S. Appl. No. 09/377,182) Notice of Allowance and Fee(s) Due dated Feb. 28, 2003.
6,584,482 (U.S. Appl. No. 09/377,182) Supplemental Notice of Allowability dated Mar. 5, 2003.
6,584,482 (U.S. Appl. No. 09/377,182) Notice of Ex Parte Reexamination dated May 4, 2005 (90/007,532).
6,584,482 (Control No. 90/007,532) Reexam Request filed May 4, 2005.
6,584,482 (Control No. 90/007,532) Office Action Granting Reexam dated Jun. 13, 2005.
6,584,482 (Control No. 90/007,532) First Office Action dated Jul. 3, 2006.
6,584,482 (Control No. 90/007,532) First Office Action Response filed Sep. 5, 2006.
6,584,482 (Control No. 90/007,532) Second Office Action dated Sep. 18, 2007.
6,584,482 (Control No. 90/007,532) Second Office Action Response filed Nov. 19, 2007.
6,584,482 (Control No. 90/007,532) Final Office Action dated Apr. 1, 2008.
6,584,482 (Control No. 90/007,532) Final Office Action Response filed Jun. 2, 2008.
6,584,482 (Control No. 90/007,532) Notice of Intent to Issue dated Jun. 17, 2008.
6,725,356 (U.S. Appl. No. 09/922,319) Continuation Application filed Aug. 2, 2001.
6,725,356 (U.S. Appl. No. 09/922,319) First Office Action dated Sep. 23, 2002.
6,725,356 (U.S. Appl. No. 09/922,319) First Office Action Response filed Mar. 24, 2003.
6,725,356 (U.S. Appl. No. 09/922,319) Craig Hansen Declaration of Incorporated Subject Matter filed Mar. 24, 2003.
6,725,356 (U.S. Appl. No. 09/922,319) Supplemental Amendment filed May 21, 2003.
6,725,356 (U.S. Appl. No. 09/922,319) Second Supplemental Amendment filed May 29, 2003.
6,725,356 (U.S. Appl. No. 09/922,319) Notice of Allowance and Issue Fee(s) Due dated Jun. 26, 2003.
6,725,356 (U.S. Appl. No. 09/922,319) Comments in Response to Reasons for Allowance filed Jul. 10, 2003.
6,725,356 (U.S. Appl. No. 09/922,319) Notice of *Inter Partes* Reexamination dated Jun. 28, 2005 (95/000,100).
6,725,356 (Control No. 95/000,100) Reexam Request Filed Jun. 28, 2005.
6,725,356 (Control No. 95/000,100) Office Action Granting Reexam dated Sep. 8, 2005.
6,725,356 (Control No. 95/000,100) First Office Action dated Sep. 8, 2005.
6,725,356 (Control No. 95/000,100) Supplement to First Office Action dated Sep. 26, 2005.
6,725,356 (Control No. 95/000,100) First Office Action Response filed Dec. 8, 2005.
6,725,356 (Control No. 95/000,100) Dr. John Moussouris Declaration dated Dec. 7, 2005.
6,725,356 (Control No. 95/000,100) Ronald Alepin Declaration dated Dec. 7, 2005.

6,725,356 (Control No. 95/000,100) Korbin Van Dyke Declaration dated Dec. 5, 2005.
6,725,356 (Control No. 95/000,100) Second Office Action dated May 3, 2006.
6,725,356 (Control No. 95/000,100) Second Office Action Response filed Jun. 30, 2006.
6,725,356 (Control No. 95/000,100) Dr. John Moussouris Declaration dated Jun. 30, 2006.
6,725,356 (Control No. 95/000,100) Korbin Van Dyke Declaration dated Jun. 30, 2006.
6,643,765 (U.S. Appl. No. 09/534,745) Continuation Application filed Mar. 24, 2000.
6,643,765 (U.S. Appl. No. 09/534,745) First Office Action dated Sep. 23, 2002.
6,643,765 (U.S. Appl. No. 09/534,745) First Office Action Response filed Mar. 21, 2003.
6,643,765 (U.S. Appl. No. 09/534,745) Craig Hansen Declaration of Incorporated Subject Matter filed Mar. 21, 2003.
6,643,765 (U.S. Appl. No. 09/534,745) Notice of Allowance and Issue Fee(s) Due dated Apr. 17, 2003.
6,643,765 (U.S. Appl. No. 09/534,745) Examiner's Amendment entered Aug. 23, 2003.
6,643,765 (Control No. 95/000,089) Reexam Request Filed Apr. 15, 2005.
6,643,765 (Control No. 95/000,089) Office Action Granting Reexam dated Jun. 1, 2005.
6,643,765 (Control No. 95/000,089) First Office Action dated Jun. 1, 2005.
6,643,765 (Control No. 95/000,089) First Office Action Response filed Oct. 3, 2005.
6,643,765 (Control No. 95/000,089) Dr. John Moussouris Declaration dated Oct. 3, 2005.
6,643,765 (Control No. 95/000,089) Korbin Van Dyke Declaration dated Oct. 3, 2005.
6,643,765 (Control No. 95/000,089) Ronald Alepin Declaration dated Oct. 3, 2005.
6,643,765 (Control No. 95/000,089) Office Action (Final) dated Mar. 2, 2006.
6,643,765 (Control No. 95/000,089) Office Action Response filed May 2, 2006.
6,643,765 (Control No. 95/000,089) Dr. John Moussouris Declaration dated May 2, 2006.
6,643,765 (Control No. 95/000,089) Korbin Van Dyke Declaration dated May 1, 2006.
Fuller et al., "The PowerPC 604™ Microprocessor—Multimedia Ready," *Circuits and Systems, 1995, Proceedings of the 38th Midwest Symposium on Rio de Janeiro, Brazil* (Aug. 13-16, 1995), New York, NY, IEEE, vol. 2, 1135-38 (Aug. 13, 1995) [XP010165331].
Gwennap, "MIPS R10000 Uses Decoupled Architecture—High-Performance Core Will Drive MIPS High-End for Years," *Microprocessor Report*, vol. 8, No. 14 (Oct. 24, 1994), MicroDesign Resources (1994) [XP002219607].
Murakami et al., "SIMP (Single Instruction Stream / Multiple Instruction Pipelining): A Novel High-Speed Single-Processor Architecture," *Computer Architecture News*, ACM, New York, NY, vol. 17, No. 3, 78-85 (Jun. 1, 1989) [XP000035291].
"UltraSPARC Multimedia Capabilities On-Chip Support for Real-Time Video and Advanced Graphics," Sun Microsystems, Inc., 1-8 (1994) [XP002177546].
P27838EP-D3-PCT Extended European Search Report dated Jul. 3, 2008 in Application No. / Patent No. 07111350.0-1243 / 1873654.
P27838EP-D6-PCT Extended European Search Report dated Jun. 27, 2008 in Application No. / Patent No. 07111348.4-1243 / 1873629.

Figure 2  Group Fixed-point Multiply and Add

Figure 3 Group Floating-point Multiply

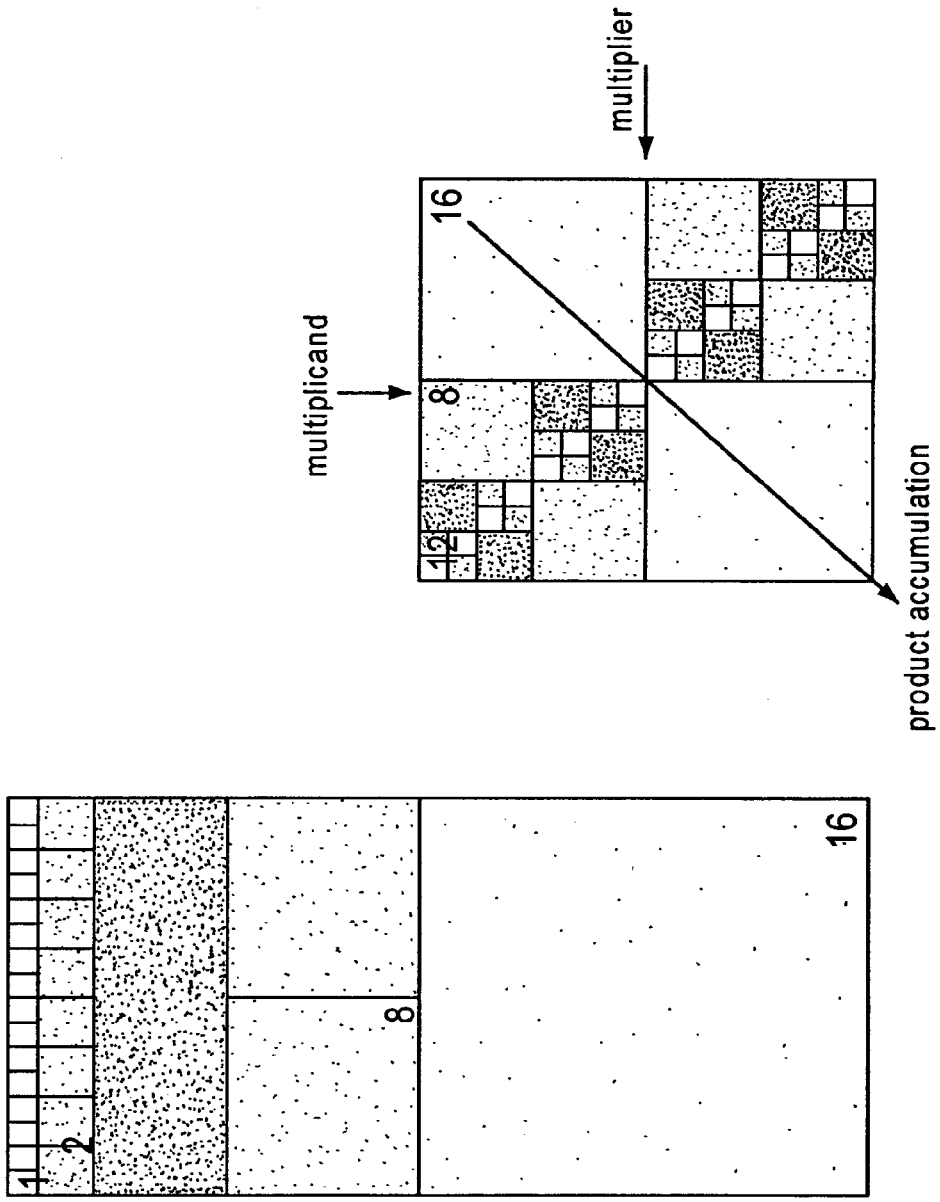
Figure 11  Group Integer Multiply

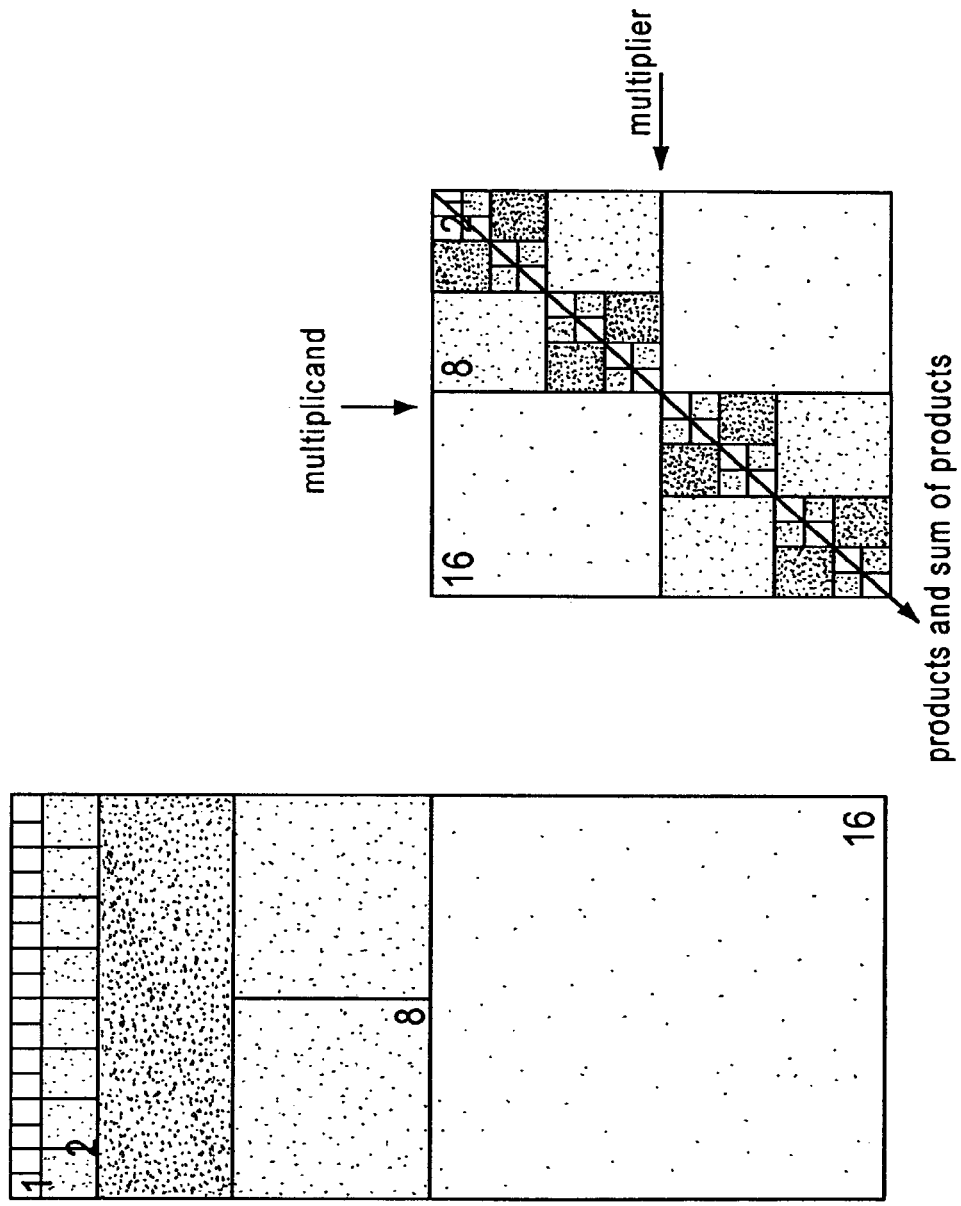

MULTIPLIER ARRAY PROCESSING SYSTEM WITH ENHANCED UTILIZATION AT LOWER PRECISION

RELATED APPLICATIONS

This application is a continuation of application Ser. No. 09/377,182, filed Aug. 19, 1999, now U.S. Pat. No. 6,584,482, which is a continuation of Ser. No. 08/857,596, filed May 16, 1997, now U.S. Pat. No. 5,953,241, which claims priority to Provisional Application Ser. No. 60/021,132, filed May 17, 1996, and also is a Continuation-in-Part of application Ser. No. 08/516,036, filed Aug. 16, 1995, now U.S. Pat. No. 5,742,840.

FIELD OF THE INVENTION

The present invention relates to an instruction set and data paths of processors which perform fixed-point and floating-point multiply and add operations, and particularly processors which perform both multiply and add operations as a result of a single instruction.

BACKGROUND OF THE INVENTION

A general-purpose processing system which performs multiply and add operations may allow these arithmetic operations to be performed at varying precision. High-precision operations generally consume greater circuit resources than low-precision operations. For example, in order to double the precision of a multiply operation, about four times as many circuits are required if the same performance is to be achieved.

A multiplier array which is capable of performing a multiply of two 64-bit operands, without reusing the array in sequential fashion, must generate the equivalent of $64^2$, or 4096 bits of binary product (a 1-bit multiply is the same as a boolean or binary "and" operation), and reduce the product bits in an array of binary adders which produces 128 bits of result. As a single binary adder (a full adder) takes in three inputs and produces two outputs, the number of binary adders required for such an array can be computed $64^2$-128, or 3968.

There are well-known techniques for reducing the number of product bits, such as Booth encoding. There are also well-known techniques for performing the required add operations so as to minimize delay, such as the use of arrays of carry-save-adders. These techniques can reduce the size of multiplier arrays and reduce the delay of addition arrays, however, these techniques do not appreciably change the relation between the size of the operand and the size of the multiplier and adder arrays.

Using the same arithmetic as before, a multiply of 32-bit operands generates the equivalent of $32^2$, or 1024 bits of binary product, and use the $32^2$-64, or 960 full adders to generate a 64-bit product. This clearly is approximately one fourth the resources required for a multiply of 64-bit operands.

Because the product of 32-bit operands is 64-bits, while the product of 64-bit operands is 128-bits, one can perform two 32-bit multiples which produce 2 64-bit products, giving a 128-bit result. As such, because the 32-bit product uses one-fourth the resources of the 64-bit product, these two 32-bit products use one-half the resources of the 64-bit product. Continuing this computation, four 16-bit products use one-quarter of the 64-bit multiplier resources, eight 8-bit products use one-eighth of the resources, and so forth.

Thus, while this technique produces results with the same number of bits as the 64-bit product, decreasing the symbol size results in a proportionately decreasing utilization of the multiplier and adder array resources. Clearly, a design that has sufficient resources for a 64-bit multiply will be under-utilized for multiplies on smaller symbols.

Accordingly, there exits a need for a method, instruction set and system in which a set of multiplier and adder circuit resources may be employed in a manner that increases the utilization of these resources for performing several multiply and add operations at once as a result of executing an instruction, and which also permits the expansion of the multiplier and adder circuit resources to an even higher level so as to further increase overall performance.

SUMMARY OF THE INVENTION

The present invention relates to a method, instruction, and system which improves the utilization of a multiplier and adder array for performing multiply and add operations at a lower precision than the full word size of the processor and particularly the multiplier and adder array.

In accordance with an exemplary embodiment of the present invention, a novel group-multiply-and-sum instruction is performed wherein operands which are the word size of the processor, for example, 128-bits, are divided into symbols where the symbols are 64, 32, 16, 8, 4, 2, or 1 bit. Multiplier and multiplicand symbols are then multiplied together, and the products are added together so as to produce a single scalar result. The instruction performs twice as many multiplies as a group-multiply-and-add instruction (as described in related U.S. patent application Ser. No. 08/516,036, hereinafter referred to as the parent application) of the same symbol size. The instruction also avoids fixed-point overflows, because in the current example, the 128-bit result is large enough to hold the sum.

In another embodiment of the present invention, a novel group multiply-and-sum-and-add instruction is performed, wherein two operands are divided into symbols and then multiplied together. All the products resulting therefrom are then added together, along with a third operand value so as to produce a single scalar result. The instruction performs twice as many multiplies as a group-multiply-and-add instruction (as described in the parent application) of the same symbol size.

In another embodiment of the present invention, a novel group-complex-multiply instruction is performed, wherein the 64-bit multiplier and multiplicand operands are divided into symbols. Alternate symbols are taken to represent real parts (a and c) and imaginary parts (b and d) of a complex value, and a computation $(a+bi)*(c+di)=(ac-bd)+(bc+ad)i$ is performed. The instruction performs twice as many multiples as a group-multiply instruction (as described in the parent application) of the same symbol size, and in the current embodiment generates a result which is a 128-bit value.

In another embodiment of the present invention, a novel group-complex-multiply-and-add is performed, wherein two 64-bit operands are divided into complex-valued symbols, and a third 128-bit operand is divided into complex-valued symbols of twice the symbol size. The computation $(a+bi)*(c+di)+(e+fi)=(ac-bd+e)+(bc+ad+f)i$ is performed. The result is a 128-bit value.

In yet another embodiment of the present invention, a novel group-convolve instruction is performed, wherein all but one symbol of a 128-bit value is multiplied with symbols of a 64-bit value. Certain of these products are summed together to form a 64-bit-by-64-bit slice of a convolution. The result is a 128-bit value.

As described in detail below, the present invention provides important advantages over the prior art. Most importantly, the present invention optimizes both system performance and overall power efficiency. The present invention performs a greater number of multiply operations and add operations in a single instruction without increasing the size of the result of this single instruction. The present invention arranges these operations in a manner which is advantageous both for implementation of digital signal processing algorithms, as the instructions perform these operations with greater parallelism and greater avoidance of arithmetic overflow, and which is advantageous for implementation of the multiplier itself, as these multipliers are formed from a partitioning of a single multiplier array, thereby overcoming significant disadvantages suffered by prior art devices as detailed above.

Additional advantages of the present invention will become apparent to those skilled in the art from the following detailed description of exemplary embodiments, which exemplify the best mode of carrying out the invention.

The invention itself, together with further objects and advantages, can be better understood by reference to the following detailed description and the accompanying drawings.

BRIEF DESCRIPTION OF THE DRAWINGS

FIG. 11 illustrates how the instructions of FIGS. 1-4 can be produced from partitions of a single multi-precision multiplier array.

FIG. 12 illustrates how the instructions of FIGS. 5-6 can be produced from partitions of a single multi-precision multiplier array.

DETAILED DESCRIPTION

A multiplier array processing system is described wherein numerous specific details are set forth, such as word size, data path size, and instruction formats etc., in order to provide a thorough understanding of the present invention. It will be obvious, however, to one skilled in the art that these specific details need not be employed to practice the present invention. In other instances, well known processor control path and data path structures have not been described in detail in order to avoid unnecessarily obscuring the present invention.

FIGS. 1-4 illustrate instructions from the instruction set forth in the parent application Ser. No. 08/516,036 filed Aug. 16, 1995.

Figure 1:
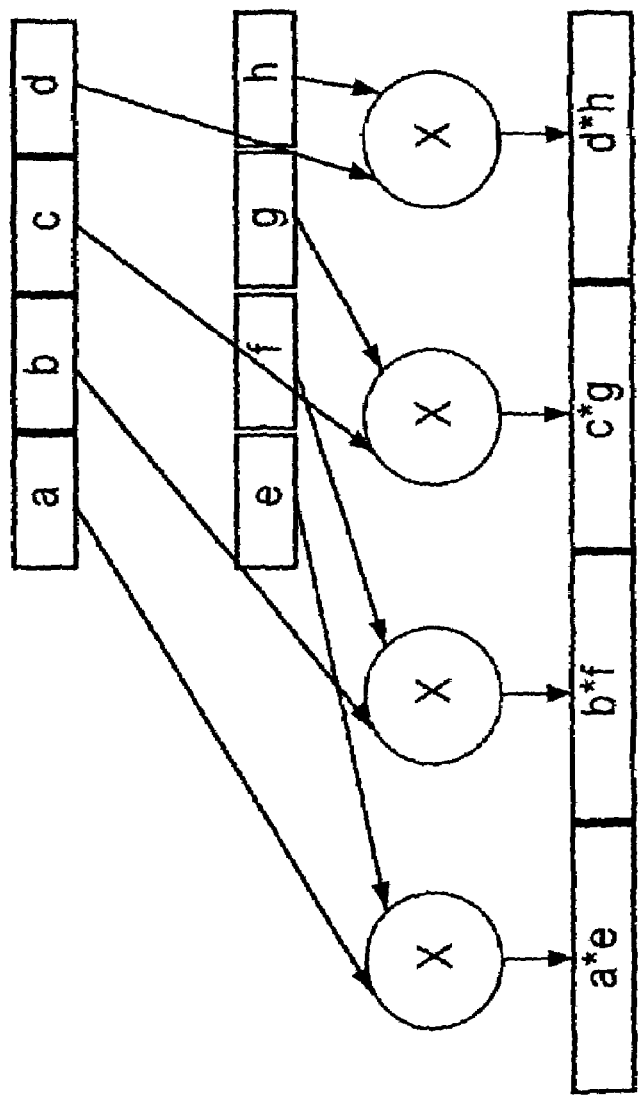
FIG. 1 illustrates a group fixed-point multiply instruction, as described in the parent application.
Figure 2:
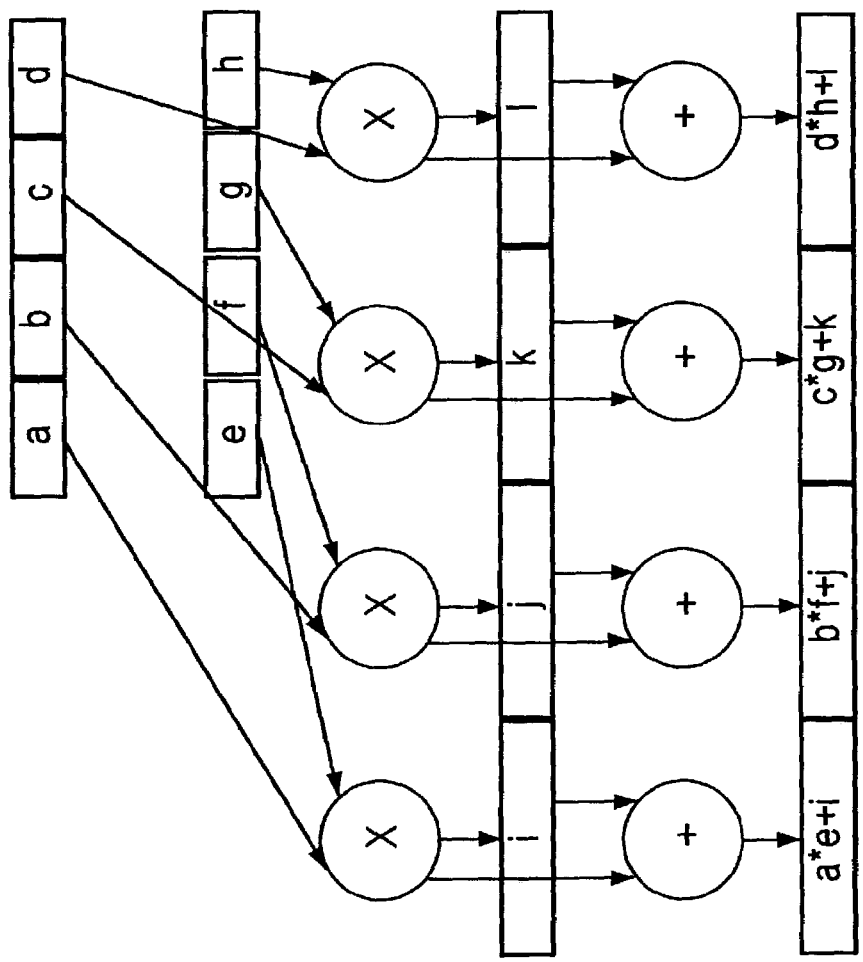
FIG. 2 illustrates a group fixed-point multiply and add instruction, as described in the parent application.

FIGS. 1 and 2 relate to fixed-point multiplication instructions, wherein groups of symbols of 64-bit total size are multiplied together, thereby producing groups of products of 128-bit total size. The individual symbols are of sizes from 1 bit to 64 bits, i.e., 64×1-bit, 32×2-bit, 16×4-bit, 8×8-bit, 4×16-bit, 2×32-bit or 1×64-bit. The products of the multiplication are twice the size of the input symbols, which reflects the size the result must be to avoid fixed-point overflow in the computation of the product.

One measure of the complexity of the instruction is the size of the result. It is preferable to limit the size of the result to 128 bits for each of the instructions, as this reduces the number and width of write ports to register files and the number of gates required to bypass results around the register file.

FIG. 2 illustrates a fixed-point multiply-and-add instruction, in which the product is added to a third value on a symbol-by-symbol basis. The instruction performs twice as many operations per instruction as the instruction shown in FIG. 1, as it performs an add operation for each multiply operation.

Figure 3:
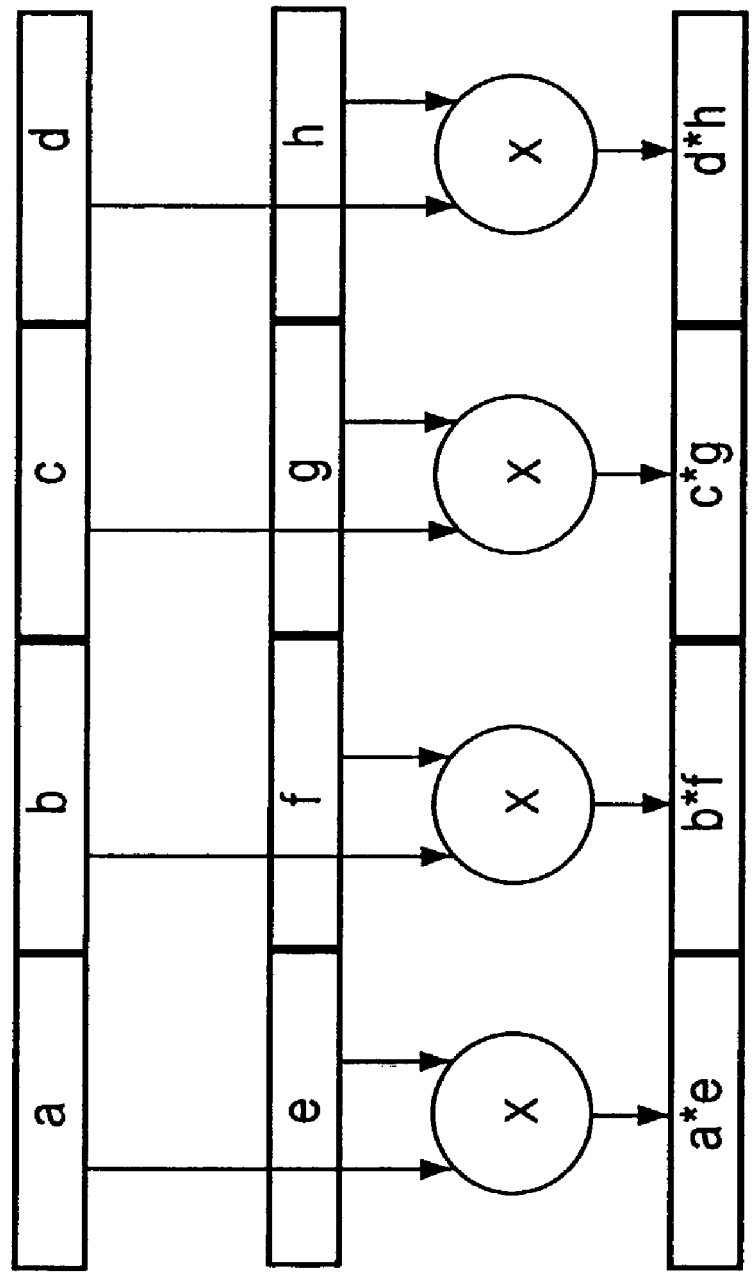
FIG. 3 illustrates a group floating-point multiply instruction, as described in the parent application.
Figure 4:
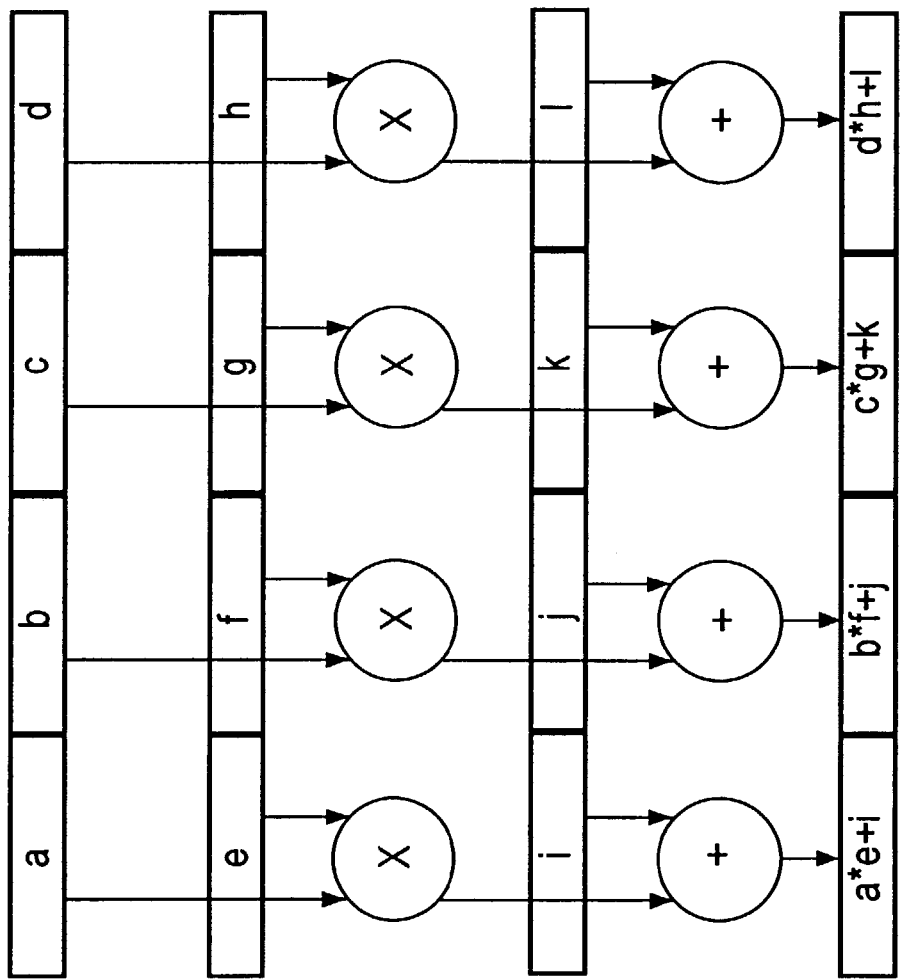
FIG. 4 illustrates a group floating-point multiply and add instruction, as described in the parent application.

FIGS. 3 and 4 illustrate the same operations, as illustrated in FIGS. 1 and 2, respectively, when floating-point operations are specified. In this case, as the size of the product is the same as the size of the input symbol (in this example—128 bits), 128 bits of source operand is allowed. Thus, for equal size of symbols, the floating-point instructions of FIGS. 3-4 perform twice as many operations as the fixed-point instructions of FIGS. 1-2.

There are many applications for the multiply and multiply-and-add instructions of FIGS. 1-4. One application, which is typical of a class of applications, is called FIR (Finite Impulse Response) filters. FIR filters are particularly easy to implement using the multiply-and-add instructions because adjacent results are independent, meaning that they can be computed separately and therefore in parallel. The group multiply-and-add instruction performs the computation for several adjacent results in parallel.

However, one problem that arises with the instruction shown in, for example, FIG. 2, is that the addition operations can suffer overflow, because the result symbols are the same size as the add source operand. This is generally avoided by scaling the values of the symbols so as to avoid overflow (i.e., making the multiplier operand smaller), so that the products which are added together are not larger than can be represented in the result symbol. This scaling results in a limit on the accuracy of the computation, as the multiplier generally has a value which must be rounded off to scale to the required precision.

Accordingly, in order to overcome this limitation, it is a goal of the present invention to provide instructions which perform a greater number of multiplies in a single operation, without increasing the size of the result to be greater than the size of an operand, which in the current example is 128 bits.

Figure 5A:
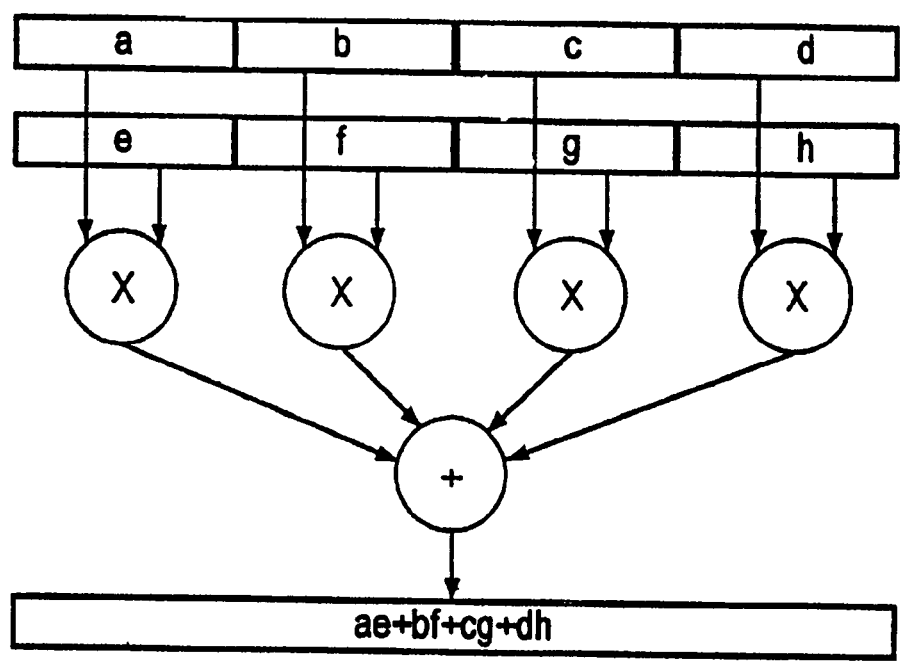
FIGS. 5A and 5B illustrate group fixed-point multiply and sum instructions of the present invention.

FIG. 5A illustrates a novel instruction which satisfies this goal. In accordance with the instruction, which is referred to as a group-fixed-point-multiply-and-sum, two 128-bit operands are divided into groups of bits, forming equal-sized symbols which may have sizes of 1, 2, 4, 8, 16, 32 and 64 bits. The groups of symbols are multiplied together to form a plurality of products, each of which are of twice the size as the operands, and then the products added together. The addition of all the products together reduces the size of the result such that the result size does not exceed 128 bits. Specifically, a 1-bit multiply-and-sum produces 128 1-bit products, which can be represented in as little as 8 bits, since the largest sum is 128; a 2-bit multiply-and-sum produces 64 4-bit products, each valued 0, 1, 4, or 9, for which the largest unsigned sum is 576, and the largest signed sum is 64*(−2 to +4)=−128 to 256, which can be represented in as little as 9 bits. In general, an n-bit multiply-and-sum produces 128/n 2n-bit products, which can be represented in $\log_2(128/n)+2n$ bits. For 64-bit symbols the products require 128 bits, and the sum of the two products would require 129 bits; the result is truncated in the same manner that the multiply-and-add operations must truncate the sum of the product with the addend, specifically, by truncating the high-order bit. As such, the group-fixed-point-multiply-and-sum instruction of FIG. 5A can accept two 128 bit groups as operands. Whereas, the group-fixed-point multiply-and-add instruction can accept only two 64-bit groups due to the limit of the total result size of 128 bits.

In fact, for all sizes of symbols from 1-16 bits, the result is no larger than 64-bits, which in some architecture designs is the width of a single register. For symbols of 32 bits, the 4 products are 64 bits each, so a 128-bit result is used, which cannot overflow on the sum operation. For symbols of 64 bits, the 2 products are 128 bits each and nearly all values can be added without overflow. The fact that this instruction takes 128-bit groups rather than 64-bit group means that twice as many multiplies are performed by this instruction, as compared to the instructions illustrated in FIGS. 1 and 2.

More specifically, referring to FIG. 5A, this instruction takes two 128-bit operands specified by ra and rb and multiplies the corresponding groups of the specified size, producing a series of results of twice the specified size. These results are then added together, after sign or zero extending as appropriate, producing a scalar result.

The size of the scalar result is 64 bits when the element size is 16 bits or smaller, and 128 bits when the element size is 32-bits or larger. For 64-bit elements, only two products are summed together, but as the result is only 128 bits, an overflow is still possible (for group signed multiply octlets and sum, the only case that overflows is when all elements equal $-2^{63}$), and an overflow causes truncation on the left and no exception. For element sizes 32-bits or smaller, no overflow can occur.

In summary, the group multiply-and-sum instruction does not result in a reduction of precision, and as a result, provides for greater precision and computation. In addition, the instruction multiplies twice as many operands as the group multiply and add instruction of the parent application, as only a scalar result is required, so that 128-bit result limitation (in the foregoing example) does not restrict the number of operands of the instruction. The 64-bit version of this instruction uses two 64×64 multiplier arrays, and smaller versions uses one-half of the arrays for each halving of operand size.

Figure 5B:
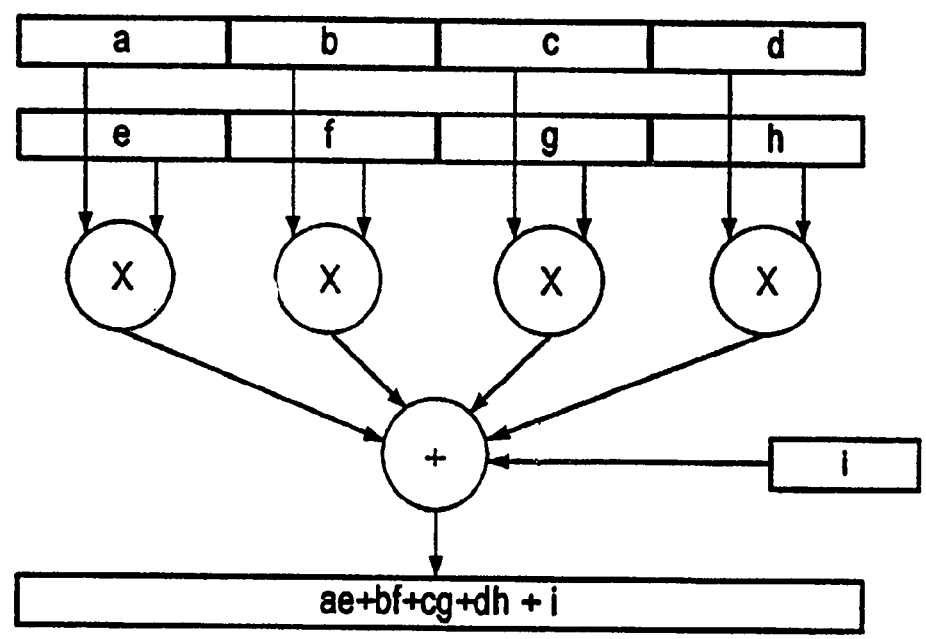

A related instruction, group-fixed-point-multiply-and-sum-and-add, is illustrated in FIG. 5B. As shown, this instruction takes the two 128-bit multiplier and multiplicand operands and divides each operand into groups, multiplies the groups thereby generating a plurality of products, and then sums the plurality of products with a third source operand. The third source operand is labelled "i", and it flows into the summation node. The result of the instruction is ae+bf+cg+dh+i.

Because the 1-16 bit versions of these multiply-and-sum-and-add instructions perform the additions with 64-bit precision, many instances of this instruction may be used repeatedly before the concern about overflow of the addition operations becomes a problem. Specifically, because the sum of the products requires at most 9 bits for the 1-bit version, 10 bits for the 2-bit version, 13 bits for the 4-bit version, 20 bits for the 8-bit version, and 35 bits for the 16-bit version, there are (64−9)=55 to (64−35)=29 additional bits for which the third source operand may repeatedly grow as further products are accumulated into a single register by repetitive use of the multiply-and-sum-and-add instruction. Thus from $2^{55}$ to $2^{29}$ multiply-and-sum-and-add instructions may be performed to a single register without concern of overflow. Thus, the instructions of the present invention permit the multiplier operand to be scaled to use the full precision of the multiplier symbols, which improves the accuracy of computations which use this instruction rather than the multiply-and-add instructions.

The multiply-and-sum and multiply-and-sum-and-add instructions of the present invention are particularly useful for implementing IIR filters (Infinite Impulse Response) filters, in which each output sample is a weighted sum of several previous output values. In such a case, the value of each output sample is dependent on the value computed for each previous output value, so the parallelism available in a FIR filter is not available in the IIR filter. Parallelism of a different form, however, can be used, in that several multiplies of weights (multipliers) with several previous output values can be performed at once, and the summing node itself can be implemented with a great deal of parallelism.

Figure 6:
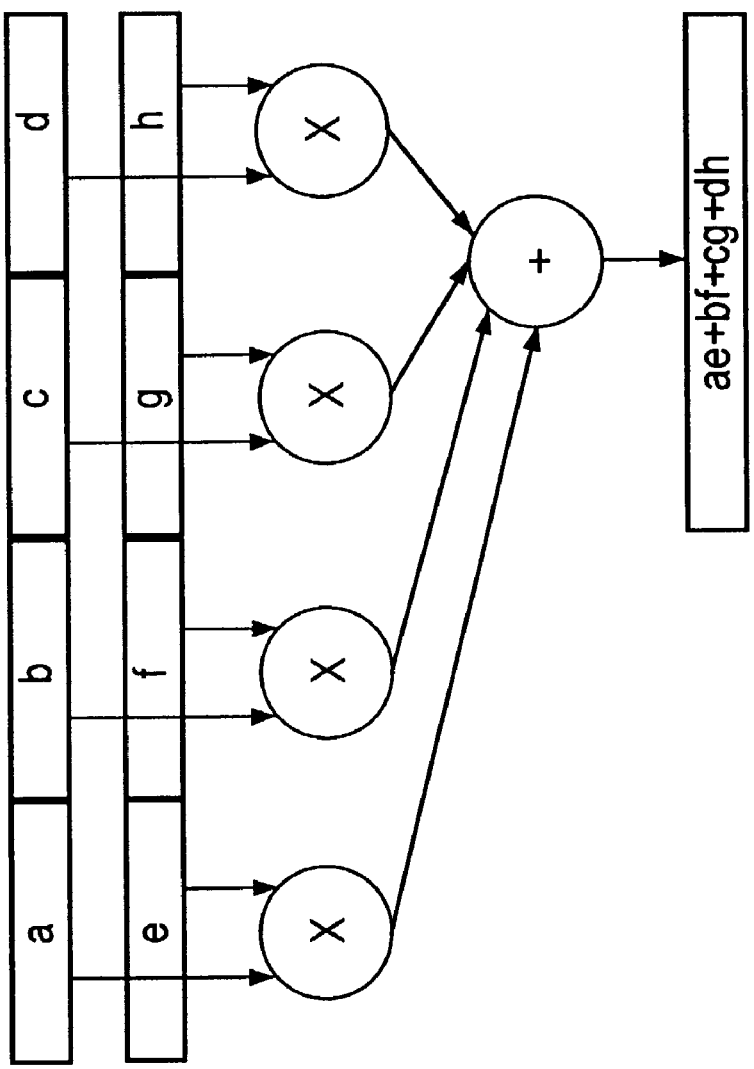
FIG. 6 illustrates a group floating-point multiply and sum instruction of the present invention.

FIG. 6 illustrates a novel group-floating-point-multiply-and-sum instruction. This instruction is useful because the sum operation can be carried out with greater precision than that of the result, when the precision is sufficiently small that more than two products are added together. This greater precision allows a more accurate result to be computed, as there is less rounding of the add result, particularly if the exponent values differ significantly for each of the products. The result does not need to be rounded until the complete sum has been computed.

Figure 7:
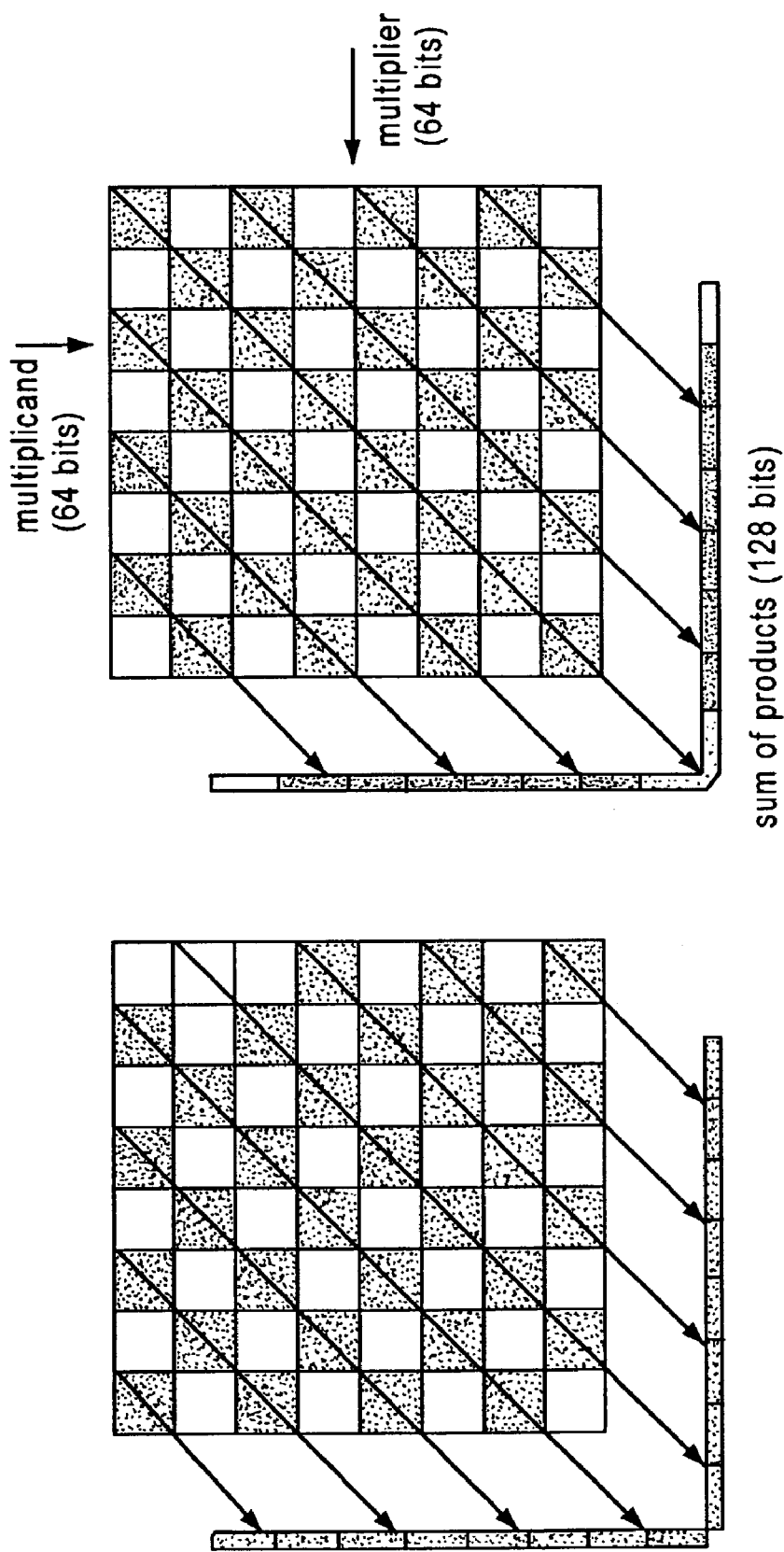
FIG. 7 illustrates one embodiment of a group fixed-point or floating-point convolve instruction of the present invention.

FIG. 7 illustrates one embodiment of a group fixed-point or floating-point convolve instruction of the present invention. There are two subtypes of this instruction, each of which use one-half of a fixed-point multiplier array. The shaded values indicate the location of products which are formed by multiplying multiplicand symbols directed from the top of the array with multiplier symbols directed from the right side of the array. Each of the indicated products connected with a dotted line are added together, yielding sums of products as the result. Each of the unshaded locations in the array are configured to generate zero values into the multipliers product accumulation array. For the fixed-point convolve instruction, the size of the result symbols are twice the size of the multiplier and multiplicand symbols. For a floating-point convolve instruction, the size of the result symbols are the same as the size of the multiplier and multiplicand symbols. As each of the subtypes use one-half of the array, it is apparent that halving the symbol size quadruples the number of multiplies.

Figure 8:
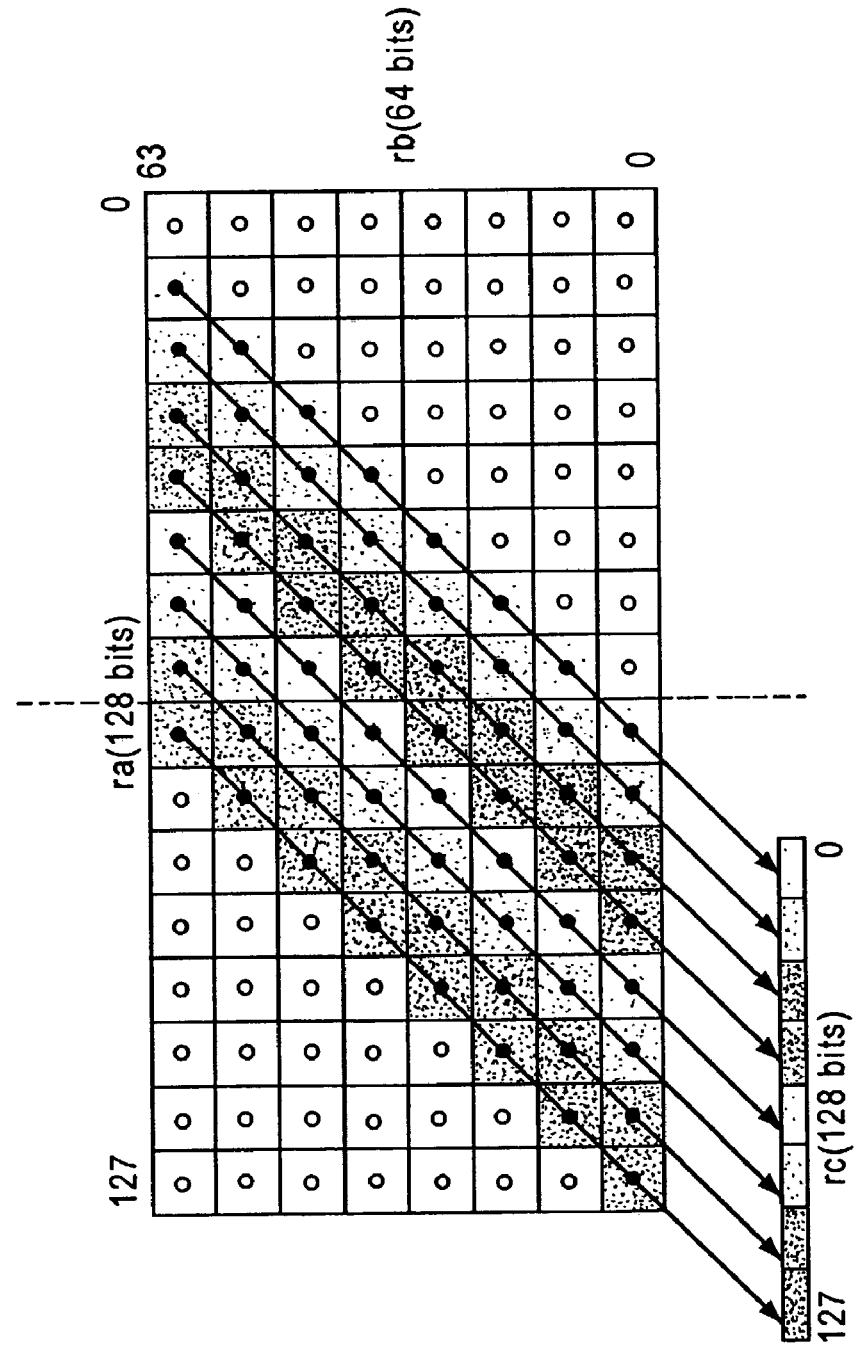
FIG. 8 illustrates a second embodiment of a group fixed-point convolve instruction of the present invention.
Figure 9:
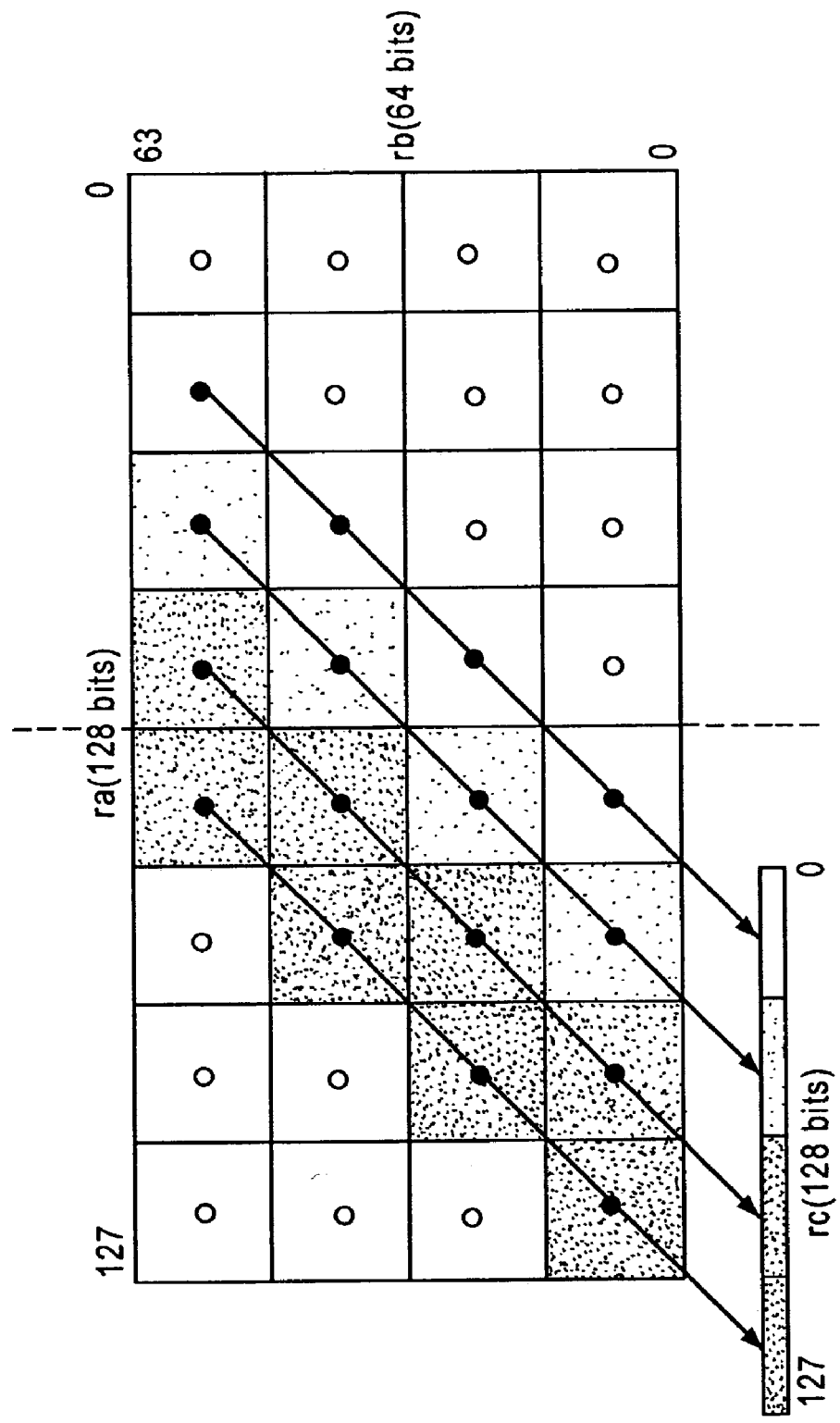
FIG. 9 illustrates an embodiment of a group 16-bit fixed-point convolve instruction of the present invention.

FIG. 8 illustrates a second embodiment of a group fixed-point convolve instruction of the present invention. In accordance with the second embodiment, a 128-bit group of symbols (ra) is multiplied with a 64-bit group of symbols (rb) in the pattern shown, and the resulting products, shown as small black circles, are added together in the pattern shown by the connecting lines, producing a 128-bit group of result symbols (rc) (of twice the size as the operand symbols, as the fixed-point products are twice the size of the multiplier and multiplicand symbols). The instruction illustrated in FIG. 8 is an 8-bit version; a 16-bit version is illustrated in FIG. 9, as the 16-bit version takes 16-bit operand symbols (ra) and (rb), and produces 32-bit result symbols (rc). As in FIG. 7, the products in FIGS. 8 and 9 are formed by multiplying together operands at the locations indicated by the black dots, where the multiplicand operand is directed from above the array, and the multiplier operand is directed from the right of the array.

Figure 10:
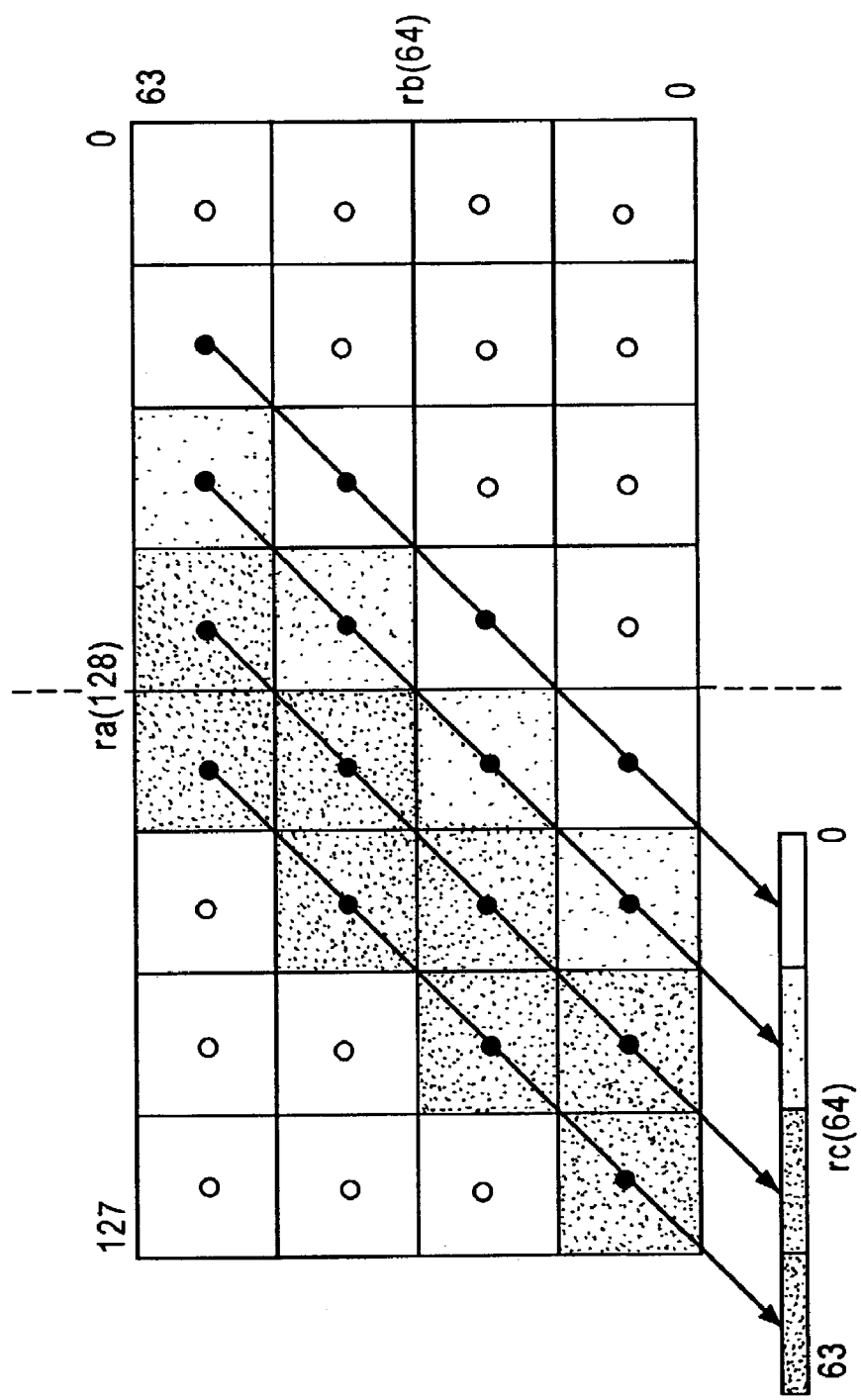
FIG. 10 illustrates a second embodiment of a group floating-point convolve instruction of the present invention.

FIG. 10 illustrates a group-floating-point-convolve, which is the same as the fixed-point convolve in structure, except that the result symbols (rc) are the same size as the operand symbols (ra) and (rb). Thus, the result of this floating-point instruction need be only 64 bits, as the floating-point product symbols are rounded to become the same size in bits as the operand symbols. An extension of this instruction can be made into one that performs four times as many multiplies, as the result size shown here is 64 bits, half of the maximum 128-bit result size limit. Such an extension would have 256 bits of operand ra and 128 bits of operand rb.

In accordance with the foregoing group convolve instructions of the present invention, the efficiency of use of the multiplier array does not decrease with decreasing operand size. In fact, the instruction provides a quadrupling of the number of effective operands each time the operand size is halved.

Referring again to FIG. 8, the group convolve instruction takes a 128-bit operand specified by ra and a 64-bit operand specified by rb, and treating the operands as ordered vectors, performs a convolution on the two vectors, truncating the computation so as to produce a 128-bit result. The result is an ordered vector of twice the specified precision. Overflow may possibly result from the summation of the products.

The group convolve instruction is designed to utilize the summation-tree of the multiplier array in a close approximation to the manner required for a scalar multiply. For this reason the ra operand is specified as 128 bits and the low-order element of the operand is not used. The rb operand uses 64-bit in the particular order required to enable the use of the existing summation tree. The result is 128-bit for fixed-point convolve and 64-bit for floating-point convolve.

As shown in FIG. 8, the result is essentially formed from portions if the multiplier array that are normally added together when performing a 64×64 multiply, although portions of the addition tree must be separated into two parts, and the result either uses both 64×64, multiplier arrays, or uses a single array which can be partitioned to multiply different operands in the upper-left triangular and lower-right triangular portions of a single 64×64 multiplier array.

It is apparent in both FIG. 8 and FIG. 9 that one-half of a 128-bit by 64-bit multiplier array is used by this instruction, and that by dividing the array into two 64-bit by 64-bit arrays in the center of the figures (as shown by dotted lines) and superimposing the two halves, that the portions of the half-arrays which are used in the left half are not used in the right half, and the portions of the half-arrays which are used in the right half are not used in the left half. Thus this instruction can be implemented with a single 64-bit by 64-bit multiplier array with appropriately partitioned operands and accumulation arrays.

FIG. 11 shows how the multiplies required for group-multiply and group-multiply-and-add instructions can be produced from a single multi-precision structure. As shown, 1×1, 2×2, 4×4, 8×8, and 16×16 multiplies are illustrated; the preferred design extends up through 32×32 and 64×64 multiplies with the same structure or pattern. The smaller multipliers are formed from subsets of the larger multipliers by gating off (forcing to zero) portions of the multiplier and multiplicand array. The resulting products are added together in a classical carry-save multiplier-accumulation tree.

FIG. 12 shows how multiplies required for group-multiply-and-sum and group-multiply-and-sum-and-add instructions can be produced from a single multi-precision structure. As shown, 1×1, 2×2, 4×4, 8×8, and 16×16 multiplies are illustrated; the preferred design extends up through 32×32 and 64×64 multiplies with the same structure or pattern. In the same fashion as FIG. 11, the smaller multipliers are formed from subsets of the larger multipliers by gating off (forcing to zero) portions of the multiplier and multiplicand array. In this case, the gating is in the reverse of the pattern of FIG. 11, so that each of the products so formed are added together by the multiplier-accumulation tree.

FIGS. 7-10 also illustrate the product and accumulation patterns indicated for each of the two embodiments of group-convolve instructions, producing these operations from a single-multi-precision structure as previously detailed.

The following operational codes and psuedo-code of the foregoing instructions are intended to assist in the understanding thereof.

Group

These instructions take two operands, perform a group of operations on partitions of bits in the operands, and catenate the results together.

Operation codes

| | |
|---|---|
| G.CONVOLVE.1[1] | Group signed convolve bits |
| G.CONVOLVE.2 | Group signed convolve pecks |
| G.CONVOLVE.4 | Group signed convolve nibbles |
| G.CONVOLVE.8 | Group signed convolve bytes |
| G.CONVOLVE.16 | Group signed convolve doublets |
| G.CONVOLVE.32 | Group signed convolve quadlets |
| G.MUL.1[2] | Group signed multiply bits |
| G.MUL.2 | Group signed multiply pecks |
| G.MUL.4 | Group signed multiply nibbles |
| G.MUL.8 | Group signed multiply bytes |
| G.MUL.16 | Group signed multiply doublets |
| G.MUL.32 | Group signed multiply quadlets |
| G.MUL.64[3] | Group signed multiply octlets |
| G.MUL.SUM.1[4] | Group signed multiply bits and sum |
| G.MUL.SUM.2 | Group signed multiply pecks and sum |
| G.MUL.SUM.4 | Group signed multiply nibbles and sum |
| G.MUL.SUM.8 | Group signed multiply bytes and sum |
| G.MUL.SUM.16 | Group signed multiply doublets and sum |
| G.MUL.SUM.32 | Group signed multiply quadlets and sum |
| G.MUL.SUM.64 | Group signed multiply octlets and sum |
| G.U.CONVOLVE.2 | Group unsigned convolve pecks |
| G.U.CONVOLVE.4 | Group unsigned convolve nibbles |
| G.U.CONVOLVE.8 | Group unsigned convolve bytes |
| G.U.CONVOLVE.16 | Group unsigned convolve doublets |
| G.U.CONVOLVE.32 | Group unsigned convolve quadlets |
| G.U.MUL.2 | Group unsigned multiply pecks |
| G.U.MUL.4 | Group unsigned multiply nibbles |
| G.U.MUL.8 | Group unsigned multiply bytes |
| G.U.MUL.16 | Group unsigned multiply doublets |
| G.U.MUL.32 | Group unsigned multiply quadlets |
| G.U.MUL.64[5] | Group unsigned multiply octlets. |
| G.U.MUL.SUM.2 | Group unsigned multiply pecks and sum |
| G.U.MUL.SUM.4 | Group unsigned multiply nibbles and sum |
| G.U.MUL.SUM.8 | Group unsigned multiply bytes and sum |
| G.U.MUL.SUM.16 | Group unsigned multiply doublets and sum |
| G.U.MUL.SUM.32 | Group unsigned multiply quadlets and sum |
| G.U.MUL.SUM.64 | Group unsigned multiply octlets and sum |

[1]G.CONVOLVE.1 is used as the encoding for G.U.CONVOLVE.1.
[2]G.MUL.1 is used as the encoding for G.UMUL.1.
[3]G.MUL.64 is used as the encoding for G.CONVOLVE.64.
[4]G.MUL.SUM.1 is used as the encoding for G.UMUL.SUM.1.
[5]G.MUL.SUM.1 is used as the encoding for G.UMUL.SUM.1.

| class | op | size |
|---|---|---|
| signed multiply | MUL MUL.SUM CONVOLVE | 1 2 4 8 16 32 64 |
| unsigned multiply | U.MUL U.MUL.SUM U.CONVOLVE | 2 4 8 16 32 64 |

Foprmat
G.op size rc=ra, rb

| 31 | 24 | 23 | 18 | 17 | 12 | 11 | 6 | 5 | 0 |
|---|---|---|---|---|---|---|---|---|---|
| G.size | | ra | | rb | | rc | | op | |
| 8 | | 6 | | 6 | | 6 | | 6 | |

DESCRIPTION

Two values are taken from the contents of registers or register pairs specified by ra and rb. The specified operation is performed, and the result is placed in the register or register pair specified by rc. A reserved instruction exception occurs for certain operations if $rc_0$ is set, and for certain operations if $ra_0$ or $rb_0$ is set.

Definition

```
def Group (op, size, ra, rb, rc)
    case op of
        G.MUL, G.U.MUL:
            a ← RegRead (ra, 64)
            b ← RegRead (rb, 64)
        G.MULSUM, G.U.MULSUM:
            a ← RegRead (ra, 128)
            b ← RegRead (rb, 128)
        G.CONVOLVE, G.U.CONVOLVE:
            a ← RegRead (ra, 128)
            b ← RegRead (rb, 64)
    endcase
    case op of
        G.MUL:
            for i ← 0 to 64-size by size
                c_{2*(i+size)-1..2*i} ← (a_{asize-1+i}^{size} ||
                    a_{size-1+i..i}) * (b_{asize-1+i}^{size} || b_{size-1+i..i})
            endfor
        G.U.MUL:
            for i ← 0 to 64-size by size
                c_{2*(i+size)-1..2*i} ← (0^{size} || a_{size-1+i..i}) *
                    (0^{size} || b_{size-1+i..i})
            endfor
        G.MUL.SUM:
            csize ← (size^2 16) ? 64 : 128
            p[0] ← 0^{csize}
            for i ← 0 to 128-size by size
                p[i+size] ← p[i] + (a_{asize-1+i}^{csize-size} ||
                    a_{size-1+i..i}) * (b_{size-1+i}^{csize-size} ||
                    b_{size-1+i..i})
            endfor
            c ← p[128]
        G.U.MUL.SUM:
            csize ← (size^2 16) ? 64 : 128
            p[0] ← 0^{csize}
            for i ← to 128-size by size
                p[i+size] ← p[i] + (0^{csize-size} ||
                    a_{size-1+i..i}) * (0^{csize-size} || b_{size-1+i..i})
            endfor
            c ← p[128]
        G.CONVOLVE:
            p[0] ← 0^{128}
            for j ← 0 to 64-size by size
                for i ← 0 to 64-size by size
                    p[j+size]_{2*(i+size)-1..2*i} ←
                    p[j]_{2*(i+size)-1..2*i} +
                        (a_{asize-1+i+64-j}^{size} ||
                        a_{size-1+i+64-j..i+64-j}) *
                        (b_{size-1+j}^{size-size} || b_{size-1+j..j})
                endfor
            endfor
            c ← p[64]
        G.U.CONVOLVE:
            p[0] ← 0^{128}
            for j ← 0 to 64-size by size
                for i ← 0 to 64-size by size
                    p[j+size]_{2*(i+size)-1..2*i} ←
                    p[j]_{2*(i+size)-1..2*i} +
                        (0^{size} || a_{size-1+i+64-j..i+64-j}) *
                        (0^{size} || b_{size-1+j..j})
                endfor
            endfor
            c ← p[64]
    endcase
    case op of
        G.MUL, G.UMUL, G.CONVOLVE, G.U.CONVOLVE:
            RegWrite (rc, 128, c)
        G.MUL.SUM, G.U.MUL.SUM:
            Reg Write (rc, csize, c)
    endcase
enddef
```

As stated above, the present invention provides important advantages over the prior art. Most importantly, the present invention optimizes both system performance and overall power efficiency, thereby overcoming significant disadvantages suffered by prior art devices as detailed above.

Thus, a multiplier array processing system is described. Although the elements of the present invention have been described in conjunction with a certain embodiment, it is appreciated that the invention may be implemented in a variety of other ways. Consequently, it is to be understood that the particular embodiment shown and described by way of illustration are in no way intended to be considered limiting. Reference to the details of these embodiments is not intended to limit the scope of the claims which themselves recite only those features regarded as essential to the invention.

We claim:

1. A method for performing a group-multiply-add instruction in a programmable processor, the method comprising:
   partitioning a first register, a second register, and a third register into a plurality of floating-point operands;
   multiplying, in parallel, the plurality of floating-point operands from the first register by the plurality of floating-point operands from the second register and adding the plurality of floating-point operands from the third register, producing a plurality of floating-point numbers; and
   providing the plurality of floating-point numbers to a plurality of partitioned fields of a result.

2. The method of claim 1 wherein the floating-point operands of the first register, the second register, the third register, and of the result are each capable of being represented by equal defined bit widths.

3. The method of claim 1 wherein the floating-point operands of the first register, the second register, and of the result are each capable of being represented by equal defined bit widths.

4. The method of claim 1 wherein the floating-point operands of the third register and of the result are each capable of being represented by equal defined bit widths.

5. The method of claim 1 wherein each of the first, second, and third registers are partitionable into four fields to hold four floating-point operands in parallel.

6. The method of claim 1 wherein the first, second, and third registers are 128 bit registers.

7. The method of claim 1 wherein the result is returned to a result register.

8. The method of claim 7 wherein the result register is a different register than either the first, second, or third registers.

9. A programmable processor for performing a group-multiply-add instruction, the processor comprising:
    first, second, and third registers partitioned into a plurality of floating-point operands; and
    a multiplier and adder array, configured to multiply, in parallel, the plurality of floating-point operands from the first register by the plurality of floating-point operands from the second register and add the plurality of floating-point operands from the third register to produce a plurality of floating-point numbers; and to provide the plurality of floating-point numbers to a plurality of partitioned fields of a result.

10. The processor of claim 9 wherein the floating-point operands of the first register, the second register, the third register, and of the result are each capable of being represented by equal defined bit widths.

11. The processor of claim 9 wherein the floating-point operands of the first register, the second register, and of the result are each capable of being represented by equal defined bit widths.

12. The processor of claim 9 wherein the floating-point operands of the third register and of the result are each capable of being represented by equal defined bit widths.

13. The processor of claim 9 wherein each of the first, second, and third registers are partitionable into four fields to hold four floating-point operands in parallel.

14. The processor of claim 9 wherein the first, second, and third registers are 128 bit registers.

15. The processor of claim 9 further comprising:
    fourth, fifth and sixth registers partitioned to into a plurality of fixed-point operands,
    wherein the multiplier and adder array is further configurable to multiply, in parallel, the plurality of fixed-point operands from the fourth register by a plurality of fixed-point operands from the fifth register and add the plurality of fixed-point operands from the sixth register to produce the plurality of fixed-point numbers; and to provide the plurality of fixed-point numbers to a plurality of partitioned fields of a result.

16. The processor of claim 9 wherein the multiplier and adder array is further configured for performing a group-multiply instruction for a plurality of floating-point operands.

17. The processor of claim 9 further comprising:
    fourth and fifth registers partitioned to into a plurality of fixed-point operands,
    wherein the multiplier and adder array is further configurable to multiply, in parallel, the plurality of fixed-point operands from the fourth register by a plurality of fixed-point operands from the fifth register to produce the plurality of fixed-point numbers; and to provide the plurality of fixed-point numbers to the plurality of partitioned fields of a result.

18. The processor of claim 9 wherein the result is returned to a result register.

19. The processor of claim 18 wherein the result register is a different register than either the first, second, or third registers.

* * * * *